(12) United States Patent
Fukatsu et al.

(10) Patent No.: US 7,158,846 B2
(45) Date of Patent: Jan. 2, 2007

(54) SYSTEM FOR PROVIDING PRODUCT ENVIRONMENT INFORMATION

(75) Inventors: Mitsuhiro Fukatsu, Kanagawa (JP); Fusayoshi Kondo, Kanagawa (JP); Masao Ueki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 523 days.

(21) Appl. No.: 09/902,194

(22) Filed: Jul. 10, 2001

(65) Prior Publication Data
US 2002/0052666 A1    May 2, 2002

(30) Foreign Application Priority Data
Jul. 10, 2000    (JP) ............................. 2000-208349
Jun. 29, 2001    (JP) ............................. 2001-199799

(51) Int. Cl.
*G06F 19/00*    (2006.01)

(52) U.S. Cl. ........................................ 700/99; 700/117

(58) Field of Classification Search ................ 700/99, 700/213, 117; 235/375; 705/28, 29
See application file for complete search history.

(56) References Cited

U.S. PATENT DOCUMENTS 5,699,525 A * 12/1997 Embutsu et al. ............... 705/7
5,965,858 A * 10/1999 Suzuki et al. ................ 235/375
6,321,983 B1 * 11/2001 Katayanagi et al. ......... 235/380
6,397,115 B1 * 5/2002 Basden .......................... 700/83
6,529,788 B1 * 3/2003 Tani et al. ..................... 700/97
6,633,795 B1 * 10/2003 Suzuki et al. ................ 700/213

* cited by examiner

*Primary Examiner*—Zoila Cabrera
(74) *Attorney, Agent, or Firm*—Morgan & Finnegan, L.L.P.

(57) ABSTRACT

An environmental information system arranged to effectively provide environmental information. The information system has a product constitution information storage section for storing product constitution information including information on parts and/or raw materials constituting each of products, an environmental information storage section for storing environmental information about each product, the parts and/or the raw materials, and an integrated environmental information forming subsystem for forming integrated environmental information with respect to each product on the basis of the product constitution information and the environmental information. The formation system provides a user with environmental information about the products according to information on user's attribute.

10 Claims, 23 Drawing Sheets

FIG. 6A

[CONSTITUTION INFORMATION]

| PARENT PART ID | PARENT PART ID SIZE | PARENT PART FILE DIVISION | PARENT PROCESS STEP | CHILD PART ID | CHILD PART ID SIZE | CHILD PART FILE DIVISION | CHILD PROCESS STEP | NUMBER |
|---|---|---|---|---|---|---|---|---|
| R71-8014-000 | 000 | R | AS | AZ7-0040-000 | 000 | W | PG | 90 |
| R71-8014-000 | 000 | R | AS | RG1-3686-000 | 000 | P | AS | 1 |
| R71-8014-000 | 000 | R | AS | RB1-2190-000 | 000 | P | MO | 1 |
| RG1-3686-000 | 000 | P | AS | RH6-3638-000 | 000 | P | PG | 1 |

EXAMPLE R71-8014-000 ┬ AZ7-0040-000
                     ├ RB1-2190-000
                     └ RG1-3686-000 ── RH6-3638-000

FIG. 6B

[ELECTRICAL PARTS INFORMATION]

| PART ID | SIZE | PROCESS STEP | DEALER | MAKER | TYPE |
|---|---|---|---|---|---|
| RG1-3686-000 | 000 | PG | K087 | 001925 | FH2-X100 |

FIG. 6C

[WORKED PARTS INFORMATION]

| PART ID | SIZE | PROCESS STEP | DEALER | MAKER | MATERIAL SYMBOL | MATERIAL GRADE | COLOR | COLORING TYPE | WEIGHT |
|---|---|---|---|---|---|---|---|---|---|
| RB1-2190-000 | 000 | MO | D097 | DA01 | POM | DE8502 | NC | NC-10 | 0.93 |

FIG. 6D

[MATERIAL INFORMATION]

| KIND OF MATERIAL | MAKER | MATERIAL SYMBOL | MATERIAL GRADE | ID | COLORING TYPE |
|---|---|---|---|---|---|
| MO | DA01 | POM | DE8502 | CC | GN1932 |
| MO | DA01 | POM | DE8502 | NC | NC-10 |
| MO | DA01 | POM | DE8502 | SB | BK602 |

FIG. 6E

[MATERIAL CONTENT SUBSTANCE]

| KIND OF MATERIAL | MAKER | MATERIAL SYMBOL | GRADE | ID | COLORING TYPE | CONTENT OF PROHIBITED SUBSTANCE | CONTENT OF SUBSTANCE TO BE REDUCED | CONTENT OF SUBSTANCE TO BE CONTROLLED | MATERIAL NUMBER |
|---|---|---|---|---|---|---|---|---|---|
| MO | DA01 | POM | DE8502 | CC | GN1932 | N | N | Y | 10041 |
| MO | DA01 | POM | DE8502 | NC | NC-10 | N | N | N | |
| MO | DA01 | POM | DE8502 | SB | BK602 | N | N | N | |

FIG. 9

PRODUCT ENVIRONMENTAL SPECIFICATION MANAGEMANT SYSTEM HOME PAGE

61 — SEARCH FOR PRODUCT ENVIRONMENTAL INFORMATION — YOU CAN SEARCH FOR AND REFER TO ENVIRONMENTAL INFORMATION ALREADY PREPARED WITH RESPECT TO EACH PRODUCT

62 — SEARCH FOR PARTS ENVIRONMENTAL INFORMATION — YOU CAN SEARCH FOR AND REFER TO ENVIRONMENTAL INFORMATION ABOUT PARTS OR A PRODUCT USING THE PARTS FROM THE PARTS AND MATERIALS

63 — REFERENCE TO MASTERS — YOU CAN REFER TO CONTENTS OF VARIOUS MASTERS INCLUDING THAT CONTAINING PRODUCT CHEMICAL SUBSTANCES

64 — COMPARISON OF PRODUCT ASSESSMENTS — ASSESSMENT TARGETS WITH RESPECT TO RESPECTIVE PRODUCTS ARE COMPARED

65 — ADMINISTRATOR MENU — PREPARATION OF NEW PRODUCT ENVIRONMENTAL INFORMATION, FINISHING OR DELETION IS PERFORMED (ADMINISTRATOR AUTHORITY REQUIRED)

66 — END — SESSION IS FINISHED, FOLLOWED BY LOGGING OUT

FIG. 11

LIST OF PRODUCT ENVIRONMENTAL INFORMATION SEARCH RESULTS

[RETURN] — 86

□ YOU CAN REGISTER OR CHECK DETAILED INFORMATION BY CLICKING ON — 85

《PREVIOUS 15 RESULTS  DISPLAY: 1ST TO 15TH RESULTS/TOTAL OF 24 RESULTS  NEXT 15 RESULTS》 DOWNLOAD ALL RESULTS — 82, 83

84 — EXPLANATION

| TO PRODUCT INFORMATION | ORDER NO. | STATUS | ENVIRONMENT CORRECTION NO. | PREPARATION | PRODUCT NAME | SALE DATE | PRODUCT GENRE | MAXIMUM POWER CONSUMPTION DURING OPERATION (W) |
|---|---|---|---|---|---|---|---|---|
| | | | | | | | | AVERAGE POWER CONSUMPTION DURING OPERATION (CSBR2-31) (wh) |
| □ | ABC12(R) | COMPLETED | 003 | TANAKA (99-10-12) | Name-ABC12 | | PIXEL | 345 |
| □ | ABC12(R) | COMPLETED | 002 | TANAKA (99-10-12) | Name-ABC12 | | PIXEL | 345 |
| □ | ABC12(R) | COMPLETED | 001 | TANAKA (99-09-02) | Name-ABC12 | | BJ CARD PRINTER | 345 |
| □ | ABC13(R) | EDITING | 001 | TANAKA (99-10-18) | Name-ABC13 | 99/10/13 | PIXEL | |
| □ | ABC27(R) | EDITING | 001 | TANAKA (99-10-12) | Name-ABC27 | | PIXEL | 111 |

[USER MASTER]

| USER_ID | PASSWORD | GENRE_BUNRUI | USER_NAME |
|---|---|---|---|
| ecosyu | ecosyu | 000002 | SYU TARO |
| ecoutuwa | ecoutuwa | 000003 | UTUWA TARO |

FIG. 12B

[LIST SYSTEM PARAMETER TABLE]

| SEIHIN_GENRE_BUNRUI | DSCOLPTN_ID | SNO | ATTR | TITLE |
|---|---|---|---|---|
| 000002 | LsPEIO | 1 | order_no | ORDER NO. |
| 000002 | LsPEIO | 2 | order_f_c | FILE DIVISION |
| 000002 | LsPEIO | 3 | status | STATUS |

FIG. 12C

[PRODUCT ENVIRONMENTAL INFORMATION TABLE]

| PRODUCT ENVIRONMENTAL INFORMATION KEY | | | | | PRODUCT ENVIRONMENTAL INFORMATION ITEM | | | |
|---|---|---|---|---|---|---|---|---|
| ORDER_NO | ORDER_F_C | TEIBAN | MODIFY_DATE | USER_ID | STATUS | AVERAGE POWER CONSUMPTION DURING OPERATION | AMOUNT OF METAL CONSUMED | DISASSEMBLY TIME | AMOUNT OF OZONE GENERATED |
| R71-8014-000 | R | 1 | 2000/5/17 | 32557 | EDITING | 1500 | 53 | 3000 | N |
| R76-1044-000 | R | 1 | 2000/4/20 | 32557 | EDITING | 1500 | 42 | 2500 | N |

FIG. 13

PRODUCT ENVIRONMENTAL INFORMATION REFERENCE/REGISTRATION

[RETURN] — 90
96 — EXPLANATION

ORDER NO.: RCP100-0130 (R) ENVIRONMENT CORRECTION NO.: 006  PRODUCT NAME: Name-RCP100-0130

- 91 — PRODUCT RAW MATERIAL INFORMATION
  LIST OF PRODUCT RAW MATERIALS    YOU CAN REFER TO LIST OF RAW MATERIAL TOTALIZATION RESULTS WITH RESPECT TO RESIN MATERIAL, PRESSED MATERIAL AND OTHER KINDS OF MATERIAL
- 92 — LIST OF PRODUCT CHEMICAL SUBSTANCES    YOU CAN REFER TO LIST OF CHEMICAL SUBSTANCES CONTAINED IN THE PRODUCT ACCORDING TO INTRACORPORATE-STANDARD CLASSIFICATION
- 93 — PARTS MATERIAL COMPOSITION INFORMATION
  DISPLAY OF CONSTITUTION INFORMATION    YOU CAN REFER TO LIST OF PARTS CONSTITUTIONS AND SELECT ITEMS TO BE DISPLAYED IN LIST FROM DISPLAY PATTERNS
- 94 — SEARCH FOR INFORMATION ON ITEMS IN PRODUCT CATEGORY    YOU CAN SEARCH FOR ITEMS IN ORDERED CATEGORY. SEARCH RESULTS ARE INDIVIDUALLY SHOWN IN LIST ACCORDING TO SELECTED DISPLAY PATTERN
- 95 — PRODUCT ASSESSMENT INFORMATION

▶ COMMON INFORMATION ▶ ENERGY SAVING ▶ SPACE SAVING ▶ RESOURCE SAVING ▶ LONG LIFE ▶ RECOVERABILITY ▶ DECOMPOSABILITY ▶ SEPARABILITY ▶ RECYCLABILITY
▶ ENVIRONMENTAL FRIENDLINESS ▶ DISPOSABILITY (REDUCING HAZARDOUS SUBSTANCES) ▶ PACKAGING ▶ INFORMATION DISCLOSURE ▶ ENVIRONMENTAL MANAGEMENT 98  99      100         101    102
[REGISTER] [RESET]  [DOWNLOAD]  [ADD TO...]  [CLEAR....]    — VALUES —          — REMARKS —

[COMMON INFORMATION]
— ITEMS —
ORDER NO.: RCP100-0130
FILE DIVISION: R
ENVIRONMENT CORRECTION NO.: 006
PREPARATION DATE: 99-10-20
PREPARER USER ID: green
STATUS: EDITING

[INPUT SYSTEM PARAMETER TABLE]

| SEIHIN_GENRE_BUNRUI | DSENT_ID | GROUP_SNO | GROUP_NAME | SNO | TAB_NAME | ATTR | TITLE |
|---|---|---|---|---|---|---|---|
| 000002 | UpdPEI | 0 | COMMON INFORMATION | 0 | seihin_kankyo | ORDER_NO | ORDER. NO |
| 000002 | UpdPEI | 0 | COMMON INFORMATION | 1 | seihin_kankyo | ORDER_F_C | FILE DIVISION |
| 000002 | UpdPEI | 0 | COMMON INFORMATION | 2 | seihin_kankyo | TEIBAN | ENVIRONMENT CORRECTION NO. |
| 000002 | UpdPEI | 0 | COMMON INFORMATION | 3 | seihin_kankyo | MODIFY_DATE | PREPARATION DATE |
| 000002 | UpdPEI | 0 | COMMON INFORMATION | 4 | seihin_kankyo | USER_ID | PREPARER USER ID |
| 000002 | UpdPEI | 0 | COMMON INFORMATION | 5 | seihin_kankyo | STATUS | STATUS |

FIG. 14B

[PRODUCT ENVIRONMENTAL INFORMATION TABLE]

| PRODUCT ENVIRONMENTAL INFORMATION KEY | | | | | | PRODUCT ENVIRONMENTAL INFORMATION ITEM | | | |
|---|---|---|---|---|---|---|---|---|---|
| ORDER_NO | ORDER_F_C | TEIBAN | MODIFY_DATE | USER_ID | STATUS | AVERAGE POWER CONSUMPTION DURING OPERATION | AMOUNT OF METAL CONSUMED | DISASSEMBLY TIME | AMOUNT OF OZONE GENERATED |
| R71-8014-000 | R | 1 | 2000/5/17 | 32557 | EDITING | 1500 | 53 | 3000 | N |
| R76-1044-000 | R | 1 | 2000/4/20 | 32557 | EDITING | 1500 | 42 | 2500 | N |

FIG. 15

PRODUCT RAW MATERIAL LIST

[RETURN] — 113

ORDER NO.: RCP100-0130 (R)   ENVIRONMENT CORRECTION NO.: 006   PRODUCT NAME: Name-RCP100-0130

KIND OF PROCESS STEP: [MO ▽] — 111    [EXECUTE] — 112

114 — EXPLANATION

ORDER NO.: RCP100-0130 (R)   ENVIRONMENT CORRECTION NO.: 006   PRODUCT NAME: Name-RCP100-0130

《PREVIOUS 10 RESULTS   DISPLAY: 1ST TO 10TH RESULTS/TOTAL OF 358 RESULTS   NEXT 10 RESULTS》 DOWNLOAD ALL RESULTS — 117

| | | | | | |
|---|---|---|---|---|---|
| GREEN CERTIFICATION DATE | | | | | |
| COMMENT | | | | | |
| GREEN CERTIFICATE | | | | | |
| BLUE ANGLE QUALIFIED BJCRG | | | | | |
| BLUE ANGLE QUALIFIED BJP | | | | | |
| BLUE ANGLE QUALIFIED LBP | | | | | |
| BLUE ANGLE QUALIFIED COPYING MACHINE | | | | | |
| MATERIAL INDICATION FOR RECYCLING | | | | | |
| RECYCLABILITY | | | | | |
| CHEMICAL SUBSTANCE TO BE CONTROLLED | N | N | N | N | Y |
| CHEMICAL SUBSTANCE TO BE REDUCED | Y | Y | Y | Y | N |
| PROHIBITED CHEMICAL SUBSTANCE | Y | N | N | N | N |
| RECYCLED MATERIAL CONTENT | | | | | |
| USE OF RECYCLED RESOURCE | | | | | |
| AMOUNT OF MATERIAL USED (g) | 30.0 | 681.0 | 352.143 | 2.143 | 19.0 |
| THICKNESS | — | — | — | — | — |
| MATERIAL NAME | ABS RESIN | ABS RESIN | ABS RESIN | ABS RESIN | ABS RESIN |
| MATERIAL SYMBOL | ABS | ABS | ABS | ABS | ABS |
| MAKER NAME | ○○○○○ CORP. | ○○○○○ CORP. | ○○○○○ CORP. | ○○○○○ CORP. | ○○○○○ CORP. |
| MAKER CODE | AA00 | AA00 | AA00 | AA00 | AA00 |
| PART DIVISION | — | — | — | — | — |
| KIND OF PROCESS STEP | MO | MO | MO | MO | MO |
| TO USED PART | ☐ | ☐ | ☐ | ☐ | ☐ |

115    116

FIG. 16A
[SELECTION SYSTEM PARAMETER]

| SEIHIN_GENRE_BJNRUI | DSSELECT_ID | GROUP_SNO | GROUP_NAME | SNO | ATTR | TITLE | DEFAULTSELECTED | DSMENU_ID |
|---|---|---|---|---|---|---|---|---|
| 000002 | LsPdtMat | 0 | DUMMY | 0 | bz.kotei_syurui | KIND OF PROCESS STEP | 0 | LsPdtMat kotei |

FIG. 16B
[MENU PARAMETER]

| SEIHIN_GENRE_BUNRUI | DSMENU_ID | SNO | TITLE | DATA | DEFAULTSELECTED |
|---|---|---|---|---|---|
| 000002 | LsPdtMat kotei | 0 | MO | MO | Y |
| 000002 | LsPdtMat kotei | 1 | PX | PX | |
| 000002 | LsPdtMat kotei | 2 | PAPER | PAPER MATERIAL | |
| 000002 | LsPdtMat kotei | 3 | LX | LX | |

FIG. 16C
[LIST SYSTEM PARAMETER]

| SEIHIN_GENRE_BUNRUI | DSCOLPTN_ID | SNO | ATTR | TITLE |
|---|---|---|---|---|
| 000002 | LsPdtMat0 | 1 | bz.order_no | ORDER NO. |
| 000002 | LsPdtMat0 | 2 | bz.order_f_c | FILE DIVISION |
| 000002 | LsPdtMat0 | 3 | bz.teiban | CORRECTION NO. |
| 000002 | LsPdtMat0 | 4 | bz.kotei_syurui | KIND OF PROCESS STEP |

FIG. 16D
[PART ENVIRONMENTAL INFORMATION TABLE]

| PRODUCT ENVIRONMENTAL INFORMATION KEY | | | PART KEY | | | | | PART ENVIRONMENTAL INFORMATION ITEM | | | |
|---|---|---|---|---|---|---|---|---|---|---|---|
| ORDER_NO | ORDER_F_C | TEIBAN | BUBAN | SUNPO | F_C | KOTEI | DEALER | PART NAME | PART WEIGHT | RECYCLING RATE | USE OF RECYCLED PART | GREEN CERTIFICATE |
| R71-8014-000 | R | 001 | RB1-6357-000 | 000 | P | MO | MO16 | UPPER COVER | 10.0 | 100 | Y | A |
| R71-8014-000 | R | 001 | RB1-6359-000 | 000 | P | MO | MO16 | LOWER COVER | 120.5 | 70 | Y | A |
| R71-8014-000 | R | 001 | RB1-6363-000 | 000 | P | MO | MO16 | RIGHT COVER | 0.9 | 50 | Y | A |
| R71-8014-000 | R | 001 | AZ7-0040-000 | 000 | P | MO | MO16 | NAMEPLATE | ? | | N | B |
| R71-8014-000 | R | 001 | FC1-6853-000 | 000 | P | PG | T455 | MEMORY | 20 | 0 | N | B |

FIG. 16E
[PART RAW MATERIAL TABLE]

| PRODUCT ENVIRONMENTAL INFORMATION KEY | | | PARENT PART KEY | | | | | RAW MATERIAL KEY | | | | | CONTENT |
|---|---|---|---|---|---|---|---|---|---|---|---|---|---|
| ORDER_NO | ORDER_F_C | TEIBAN | PBUBAN | PSUNPO | PF_C | PKOTEI | | KOTEI_SYURUI | MAKER_CD | ZAISITU_KIGO | GRADE_NO | CHAKUSYOKU_NO | JYURYO |
| R71-8014-000 | R | 001 | RB1-6357-000 | 000 | P | MO | | MO | AA00 | PMMA | SR6500 | KMH1074 | 0.7 |
| R71-8014-000 | R | 001 | RB1-6359-000 | 000 | P | MO | | MO | AA00 | PMMA | SR6500 | KMH1074 | 10.2 |
| R71-8014-000 | R | 001 | RB1-6363-000 | 000 | P | MO | | MO | AA00 | PMMA | SR6500 | KMH1074 | 0.5 |

FIG. 17

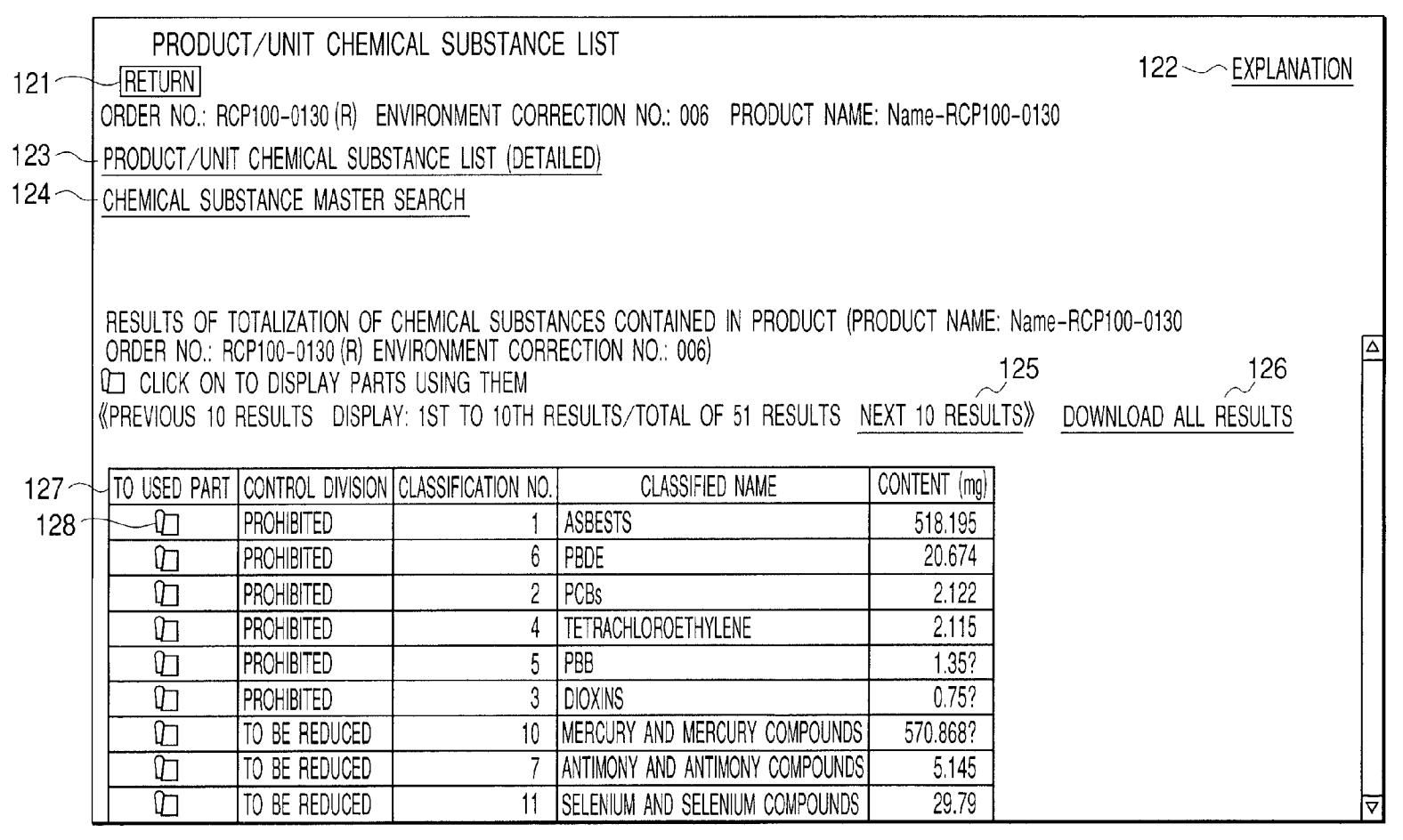

PRODUCT/UNIT CHEMICAL SUBSTANCE LIST

[RETURN] — 121

ORDER NO.: RCP100-0130 (R) ENVIRONMENT CORRECTION NO.: 006   PRODUCT NAME: Name-RCP100-0130

PRODUCT/UNIT CHEMICAL SUBSTANCE LIST (DETAILED) — 123

CHEMICAL SUBSTANCE MASTER SEARCH — 124

122 — EXPLANATION

RESULTS OF TOTALIZATION OF CHEMICAL SUBSTANCES CONTAINED IN PRODUCT (PRODUCT NAME: Name-RCP100-0130
ORDER NO.: RCP100-0130 (R) ENVIRONMENT CORRECTION NO.: 006)
☐ CLICK ON TO DISPLAY PARTS USING THEM
《PREVIOUS 10 RESULTS  DISPLAY: 1ST TO 10TH RESULTS/TOTAL OF 51 RESULTS  NEXT 10 RESULTS》  DOWNLOAD ALL RESULTS 125   126

| TO USED PART | CONTROL DIVISION | CLASSIFICATION NO. | CLASSIFIED NAME | CONTENT (mg) |
|---|---|---|---|---|
| ☐ | PROHIBITED | 1 | ASBESTS | 518.195 |
| ☐ | PROHIBITED | 6 | PBDE | 20.674 |
| ☐ | PROHIBITED | 2 | PCBs | 2.122 |
| ☐ | PROHIBITED | 4 | TETRACHLOROETHYLENE | 2.115 |
| ☐ | PROHIBITED | 5 | PBB | 1.35? |
| ☐ | PROHIBITED | 3 | DIOXINS | 0.75? |
| ☐ | TO BE REDUCED | 10 | MERCURY AND MERCURY COMPOUNDS | 570.868? |
| ☐ | TO BE REDUCED | 7 | ANTIMONY AND ANTIMONY COMPOUNDS | 5.145 |
| ☐ | TO BE REDUCED | 11 | SELENIUM AND SELENIUM COMPOUNDS | 29.79 |

127
128

FIG. 18A
[LIST SYSTEM PARAMETER TABLE]

| SEIHIN_GENRE_BUNRUI | DSCOLPTN_ID | SNO | ATTR | TITLE |
|---|---|---|---|---|
| 000002 | LsPdtCAPdt | 1 | dbm.kanri_kubun | CONTROL DIVISION |
| 000002 | LsPdtCAPdt | 2 | dbm.bunrui_no | CLASSIFICATION NO. |
| 000002 | LsPdtCAPdt | 3 | dbm.bunrui_name | CLASSIFIED NAME |

FIG. 18B
[CONSTITUTION TABLE]

| PRODUCT ENVIRONMENTAL INFORMATION KEY | | | PART KEY | | | | |
|---|---|---|---|---|---|---|---|
| ORDER_NO | ORDER_F_C | TEIBAN | SNO | BUBAN | SUNPO | F_C | KOTEI | INZU |
| R71-8014-000 | R | 001 | 547 | RB1-6357-000 | 000 | P | MO | 1 |
| R71-8014-000 | R | 001 | 549 | RB1-6359-000 | 000 | P | MO | 1 |
| R71-8014-000 | R | 001 | 550 | RB1-6360-000 | 000 | P | MO | 1 |
| R71-8014-000 | R | 001 | 551 | RB1-6361-000 | 000 | P | MO | 1 |
| R71-8014-000 | R | 001 | 552 | RB1-6363-000 | 000 | P | MO | 1 |

FIG. 18C
[PART RAW MATERIAL TABLE]

| PRODUCT ENVIRONMENTAL INFORMATION KEY | | | PARENT PART KEY | | | | RAW MATERIAL KEY | | | | | |
|---|---|---|---|---|---|---|---|---|---|---|---|---|
| ORDER_NO | ORDER_F_C | TEIBAN | PBUBAN | PSUNPO | PF_C | PKOTEI | KOTEI_SYURUI | MAKER_CD | ZAISITU_KIGO | GRADE_NO | CHAKUSYOKU_NO | JYURYO |
| R71-8014-000 | R | 001 | RB1-6357-000 | 000 | P | MO | MO | AA00 | PMMA | SR6500 | KMH1074 | 0.7 |
| R71-8014-000 | R | 001 | RB1-6359-000 | 000 | P | MO | MO | AA00 | PMMA | SR6500 | KMH1074 | 10.2 |
| R71-8014-000 | R | 001 | RB1-6363-000 | 000 | P | MO | MO | AA00 | PMMA | SR6500 | KMH1074 | 0.5 |

FIG. 18D
[IN-RAW-MATERIAL CONTROLLED COMPONENT TABLE]

| PRODUCT ENVIRONMENTAL INFORMATION KEY | | | RAW MATERIAL KEY | | | | | CONTROLLED COMPONENT KEY | | CONTENT |
|---|---|---|---|---|---|---|---|---|---|---|
| ORDER_NO | ORDER_F_C | TEIBAN | KOTEI_SYURUI | MAKER_CD | ZAISITU_KIGO | GRADE_NO | CHAKUSYOKU_NO | BUNRUI_NO | BUSITU_NO | JYURYO |
| R71-8014-000 | R | 001 | MO | AA00 | PMMA | SR6500 | KMH1074 | 41 | 10076 | 1000 |

FIG. 18E
[TYPICAL SUBSTANCE MASTER]

| BUNRUI_NO | BUNRUI_NAME | KANRI_KUBUN | T_DATE |
|---|---|---|---|
| 41 | PHENOL, PHENOLIC COMPOUNDS | C | 1999/5/31 |

FIG. 18F
[SUBSTANCE MASTER]

| BUSITU_NO | BUSITU_NAME | CAS_NO | BUSITU_NAME_F | T_DATE |
|---|---|---|---|---|
| 10076 | 2(2-HYDROXY-5-METHYLPHENYL) BENZOTRIAZOLE | 2440-22-4 | | 99-09-07 |

FIG. 18G
[LAW-REGULATION MASTER]

| LAW_NO | LAW_NAME |
|---|---|
| 4 | LAWS REGULATING WATER QUALITY |

FIG. 18H
[LABEL MASTER]

| LABEL_NO | LABEL_NAME |
|---|---|
| 1 | CMLL |

FIG. 18I
[CHEMICAL SUBSTANCE LAW-REGULATION MASTER]

| BUNRUI_NO | BUSITU_NO | LAW_NO |
|---|---|---|
| 12 | 10085 | 4 |

FIG. 18J
[CHEMICAL SUBSTANCE LABEL MASTER]

| BUNRUI_NO | BUSITU_NO | LABEL_NO |
|---|---|---|
| 12 | 10085 | 1 |

FIG. 19

DETAILED LIST OF PRODUCT/UNIT CHEMICAL SUBSTANCES

[RETURN] — 131

ORDER NO.: RCP100-0130 (R)  ENVIRONMENT CORRECTION NO.: 006  PRODUCT NAME: Name-RCP100-0130

132 — EXPLANATION

PRODUCT NAME CHEMICAL SUBSTANCES CONTAINED IN PRODUCT (PRODUCT NAME: Name-RCP100-0130 ORDER NO.: RCP100-0130 (R) ENVIRONMENT CORRECTION NO.: 006)

《PREVIOUS 10 RESULTS  DISPLAY: 1ST TO 10TH RESULTS/TOTAL OF 79 RESULTS  NEXT 10 RESULTS》  DOWNLOAD ALL RESULTS
— 133                                                                                           — 136
138

| TO USED PART | LABEL | LAW REGULATION | CONTROL DIVISION | CLASSI-FICATION NO. | CLASSIFIED NAME | MATERIAL NO. | MATERIAL NAME | CASE NO. | CONTENT (mg) |
|---|---|---|---|---|---|---|---|---|---|
| ☐ | LABEL | REGULATED | PROHIBITED | 4 | TETRACHLOROETHYLENE | 10004 | TETRACHLOROETHYLENE | 127-18-4 | 2.115 |
| ☐ | LABEL | REGULATED | PROHIBITED | 3 | DIOXINs | 10003 | DIOXINs | | 0.75? |
| ☐ | LABEL | REGULATED | PROHIBITED | 1 | ASBESTOs | 10001 | ASBESTOs | 1332-21-4 | 3.445 |
| ☐ | LABEL | REGULATED | PROHIBITED | 1 | ASBESTOs | 999 | test | 999 | 514.75 |
| ☐ | LABEL | REGULATED | PROHIBITED | 2 | PCBs | 10002 | PCBs | 1336-36-3 | 2.122 |
| ☐ | LABEL | REGULATED | PROHIBITED | 6 | PBDE | 10006 | PBDE | 1163-19-5 | 20.674 |
| ☐ | LABEL | REGULATED | PROHIBITED | 5 | PBB | 10005 | PBB | 59536-65-1 | 1.35? |
| ☐ | LABEL | REGULATED | TO BE REDUCED | 16 | MANGANESE AND MANGANESE COMPOUNDS | 10016 | MANGANESE AND MANGANESE COMPOUNDS | | 1.125 |
| ☐ | LABEL | REGULATED | TO BE REDUCED | 20 | HALOGEN-BASED FORMED RESIN ADDITIVE (FLAME RETARDANT) | 10064 | POLYTETRAFLUOROETHYLENE | | 0.675? |
| ☐ | LABEL | REGULATED | TO BE REDUCED | 15 | BERYLLIUM AND BERYLLIUM COMPOUNDS | 10015 | BERYLLIUM AND BERYLLIUM COMPOUNDS | | 0.55 |

135 — 137 — 136

SYSTEM FOR PROVIDING PRODUCT ENVIRONMENT INFORMATION

BACKGROUND OF THE INVENTION

1. Field of the Invention

The present invention relates to a technique for managing environmental information and, more particularly, to a technique for managing environmental information about products.

2. Related Background Art

In general, a design system is used to manage, in designing of a product, product constitution information, drawings, parts specifications, etc. A procurement system is used to manage procurement results, i.e., information on parts and dealers, information on parts and raw materials, etc. Such design and procurement systems and environmental information about parts are not linked with each other, and it is difficult to obtain environmental information about a product. To obtain environmental information about a product, it is necessary to manually check information used in the design system, information used in the procurement system, and environmental information about parts and materials with each other. The process of manually checking such information is complicated and requires a great deal of labor.

On the other hand, makers, etc., are requested to consider environmental problems and to produce products friendly to environmental, and there is a demand for a system which enables effective use of environmental information.

SUMMARY OF THE INVENTION

In view of the above-described circumstances, an object of the present invention is to provide a system and method for processing environmental information effectively and a recording medium on which a program for processing environmental information is recorded.

To achieve this object, according to one aspect of the present invention, there is provided an environmental information system comprising a product constitution information storage section for storing product constitution information including information on parts and/or raw materials constituting each of products, an environmental information storage section for storing environmental information about each product, the parts and/or the raw materials, and integrated environmental information forming means for forming integrated environmental information with respect to each product on the basis of the product constitution information and the environmental information.

According to another aspect of the present invention, there is provided an environmental information system comprising a product constitution information storage section for storing product constitution information including information on raw materials constituting each of products, a raw material environmental information storage section for storing environmental information about the raw materials, and integrated environmental information forming means for forming integrated environmental information with respect to each product on the basis of the product constitution information and the environmental information about the raw materials.

According to still another aspect of the present invention, there is provided an environmental information system for forming environmental data about products, the system comprising environmental data forming means for forming environmental data about each product from design data, ordering data based on the design data, material data on the order-receiving side, hazardous chemical substance data originally input, and user information.

According to yet another aspect of the present invention, there is provided a method of processing environmental information, comprising the steps of storing product constitution information including information on parts and/or raw materials constituting each of products, storing environmental information about each product, the parts and/or the raw materials, and forming integrated environmental information with respect to each product on the basis of the product constitution information and the environmental information.

According to a further aspect of the present invention, there is provided a method of processing environmental information, comprising the steps of storing product constitution information including information on raw materials constituting each of products, storing environmental information about the raw materials, and forming integrated environmental information with respect to each product on the basis of the product constitution information and the environmental information.

According to still a further aspect of the present invention, there is provided a method of processing environmental information, comprising the steps of storing user information, searching environmental information about products according to the user information and on the basis of a data base in which the environmental information is stored, and displaying a result of a search through the environmental information obtained in the searching step.

According to still a further aspect of the present invention, there is provided an environmental information processing method in which environmental data about products are formed, the method comprising the steps of storing design data, ordering data based on the design data, material data on the order-receiving side, hazardous chemical substance data, and user information, respectively and forming environmental data about each product from the design data, the ordering data, the material data, the hazardous chemical substance data, and the user information.

BRIEF DESCRIPTION OF THE DRAWINGS

FIGS. 6A, 6B, 6C, 6D and 6E are diagrams showing examples of tables;

FIG. 9 is a diagram showing a product environment home page window;

FIG. 11 is a diagram showing a product environmental information search result list window;

FIGS. 12A, 12B and 12C are diagrams showing tables for displaying the product environmental information search result list window;

FIG. 13 is a diagram showing a product environmental information reference/registration window;

FIGS. 14A and 14B are diagrams showing tables for displaying the product environmental information reference/registration window;

FIG. 15 is a diagram showing a product raw material list window;

FIGS. 16A, 16B, 16C, 16D and 16E are diagrams showing tables for displaying the product raw material list window;

FIG. 17 is a diagram showing a product/unit chemical substance list window;

FIGS. 18A, 18B, 18C, 18D, 18E, 18F, 18G, 18H, 18I and 18J are diagrams showing tables for displaying the product/unit chemical substance list window;

FIG. 19 is a diagram showing a detailed product/unit chemical substance list window;

DESCRIPTION OF THE PREFERRED EMBODIMENTS

Figure 1:
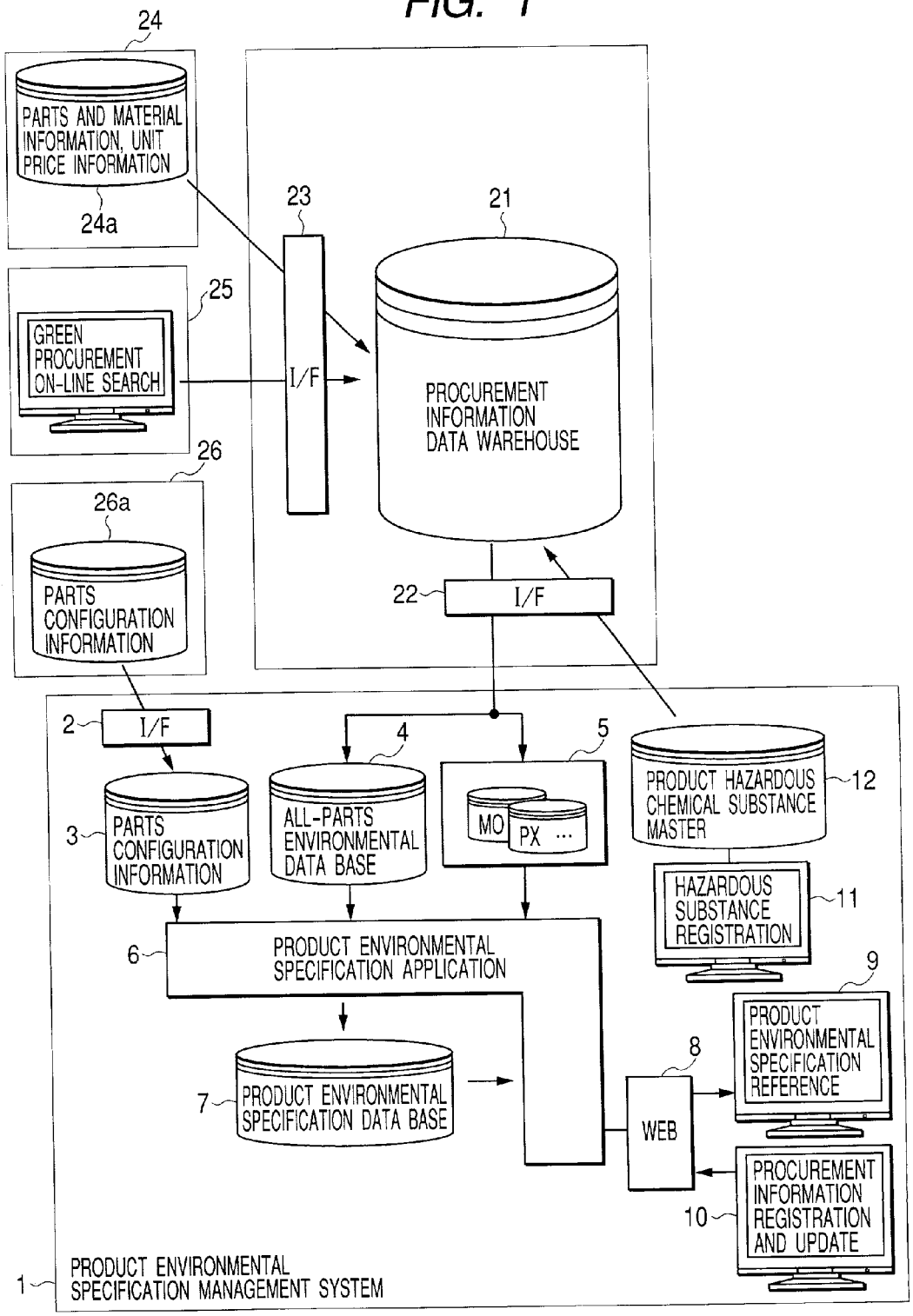
FIG. 1 is a diagram showing the configuration of an environmental information system according to an embodiment of the present invention.

FIG. 1 shows an example of the configuration of an environmental information system according to an embodiment of the present invention.

A parts/material/price scale information system (procurement system) 24 prepares parts information, raw material information and price scale information (ordering data) on the basis of a data base 24a and supplies these kinds of information to a procurement information data warehouse 21 through an interface 23. More specifically, the system 24 supplies information shown in FIGS. 6B to 6D, for example.

FIG. 6B shows electrical parts information including items: "part ID", "size", "process step", "dealer", "maker", "type", etc. FIG. 6C shows worked parts information including items: "part ID", "size", "process step", "dealer", "maker", "material", "grade", "color", "coloring", and "weight". FIG. 6D shows material information (material data) including items: "kind of material", "maker", "material symbol", "grade", "ID", "coloring", "type", etc.

Referring to FIG. 1, a green (environmental) procurement on-line search system 25 supplies, for example, environmental information about each part and raw materials (hazardous chemical substance content data), as shown in FIG. 6E, to the procurement information data warehouse 21 through the interface 23. FIG. 6E shows substance-contained-in-material information as an example of environmental information. Items of substance-contained-in-material information shown in FIG. 6E are "kind of material", "maker", "material symbol", "grade", "ID", "coloring", "type", the existence/nonexistence of a "content of prohibited substance" ("Y": existence, "N": nonexistence), the existence/nonexistence of a "content of substance to be reduced" ("Y": existence, "N": nonexistence), the existence/nonexistence of a "content of substance to be controlled" ("Y": existence, "N": nonexistence, and a "substance number" of such substances (a prohibited substance, a substance to be reduced, a substance to be controlled). Apart from ordinary prohibited substances or substances to be reduced, a substance to be controlled is designated as a substance to be prohibited or reduced under the control according to a regulation specially established in a corporation or the like which operates this system. These kinds of environmental information (e.g., information on hazardous substances) are used to enable use of parts friendly to environmental and row materials and, hence, designing and manufacture of products friendly to environmental.

Prohibited substances and substances to be reduced are determined on the basis of governmental regulations or treaties between nations. A data base is prepared in which data on substances controlled under laws is recorded in accordance with respective governmental regulations and treaties. Prohibited substances or the like are prescribed based on this data base. Prohibited substances or the like may be determined according to strictest regulations. In this embodiment, regulations according to a country for which a product is destined and a treaty is selected. Also, a country may be separately designated to make a search for relating information.

Referring again to FIG. 1A, a hazardous substance registration system 11 in a product environmental specification management system 1 can register hazardous substances (regulation data) in a product hazardous chemical substance master data base 12. Data on hazardous substances in the data base 12 is supplied to the data warehouse 21 through an interface 22. This data on hazardous substances is also used as environmental information.

The data warehouse 21 supplies the above-described information to an all-parts environmental data base 4 and to a material data base 5.

A parts configuration information system (design system) 26 prepares product constitution information, information on parts specifications and the like (design data) as shown in FIG. 6A on the basis of a parts configuration information data base 26a, and supplies this information to a parts configuration information data base 3 through an interface 2. FIG. 6A shows parts configuration information including items: "parent part ID", "parent part size", "parent part file division", "parent part process step", "child part ID", "child part size", "child part file division", "child part process step", and "number" (the number of parts or the like used). The upper section of FIG. 6A shows the relationship between a parent part and child parts constituting the parent part, as expressed in a tree structure shown in the lower section of FIG. 6A.

Referring to FIG. 1, a product information registration and updating system 10 can register and update product information (including environment information of a product) through a Web server 8. A product environmental specification application (computer program) 6 is executed to form and register, in a product environmental specification data base 7, integrated product environmental information on the basis of product information registered and updated by the product information registration and updating system 10, the parts configuration information data base 3, the all-parts environmental data base 4, and the material data base 5. At the time of this formation and registration, product environment keys are assigned to products in one-to-one correspondence with each other, thereby forming product information including data on various parts and/or raw materials.

A user can refer to product environmental information in the product environmental specification data base 7 through the Web server 8 and the product environmental specification 6 by using a product environmental specification reference system 9. For example, if an instruction is provided to totalize the amount of each of raw materials used, the total weights of materials determined on the basis of the weights of the materials used in parts and the numbers of parts are displayed in descending order. Also, if an instruction is provided to totalize the amount of each of hazardous chemical substances, the total contents of the hazardous chemical substances determined on the basis of the contents of the hazardous chemical substance in raw materials and the weight of the raw materials used are displayed in descending order.

Figure 2:
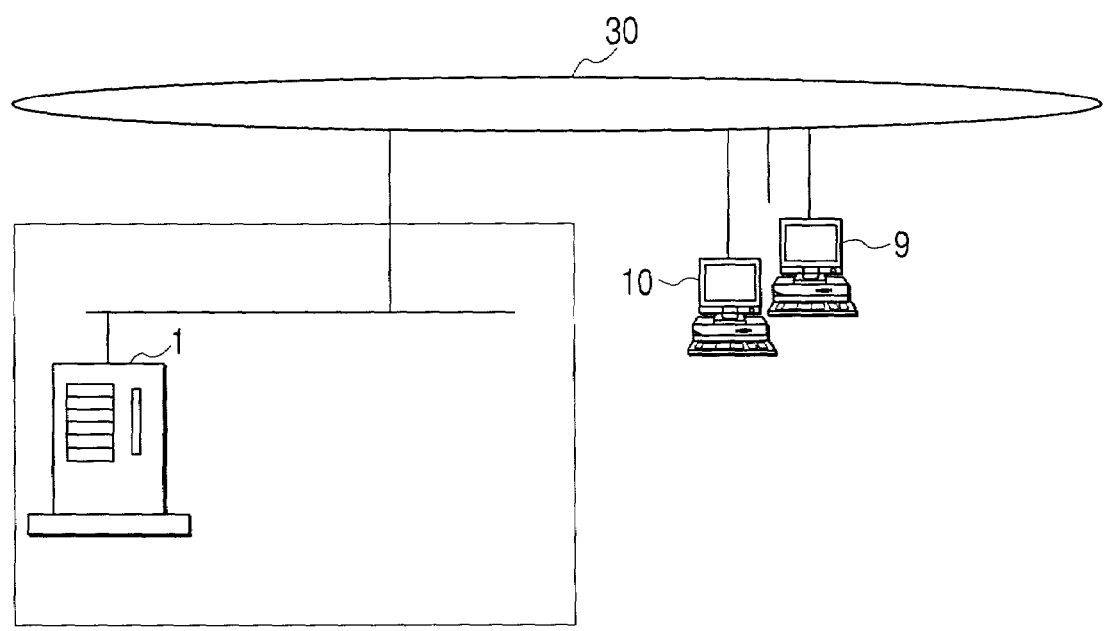
FIG. 2 is a diagram showing the configuration of the environmental information system connected to a network.

FIG. 2 shows a network system in which the above-described product environmental specification management system 1 and systems 9 and 10 are connected to a network 30. For example, the network 30 is an intracorporate local area network (LAN). The product environmental specification management system 1 has the functions of a data base server, an application server and a Web server, and uses, for example, Windows NT (a product by Microsoft Corporation) as an operating system. The systems 9 and 10 may be provided as one computer having both the functions of the systems 9 and 10 or separate computers respectively having the functions of the systems 9 and 10. The computer may be, for example, a personal computer on which a Web browser can operate.

Figure 3:
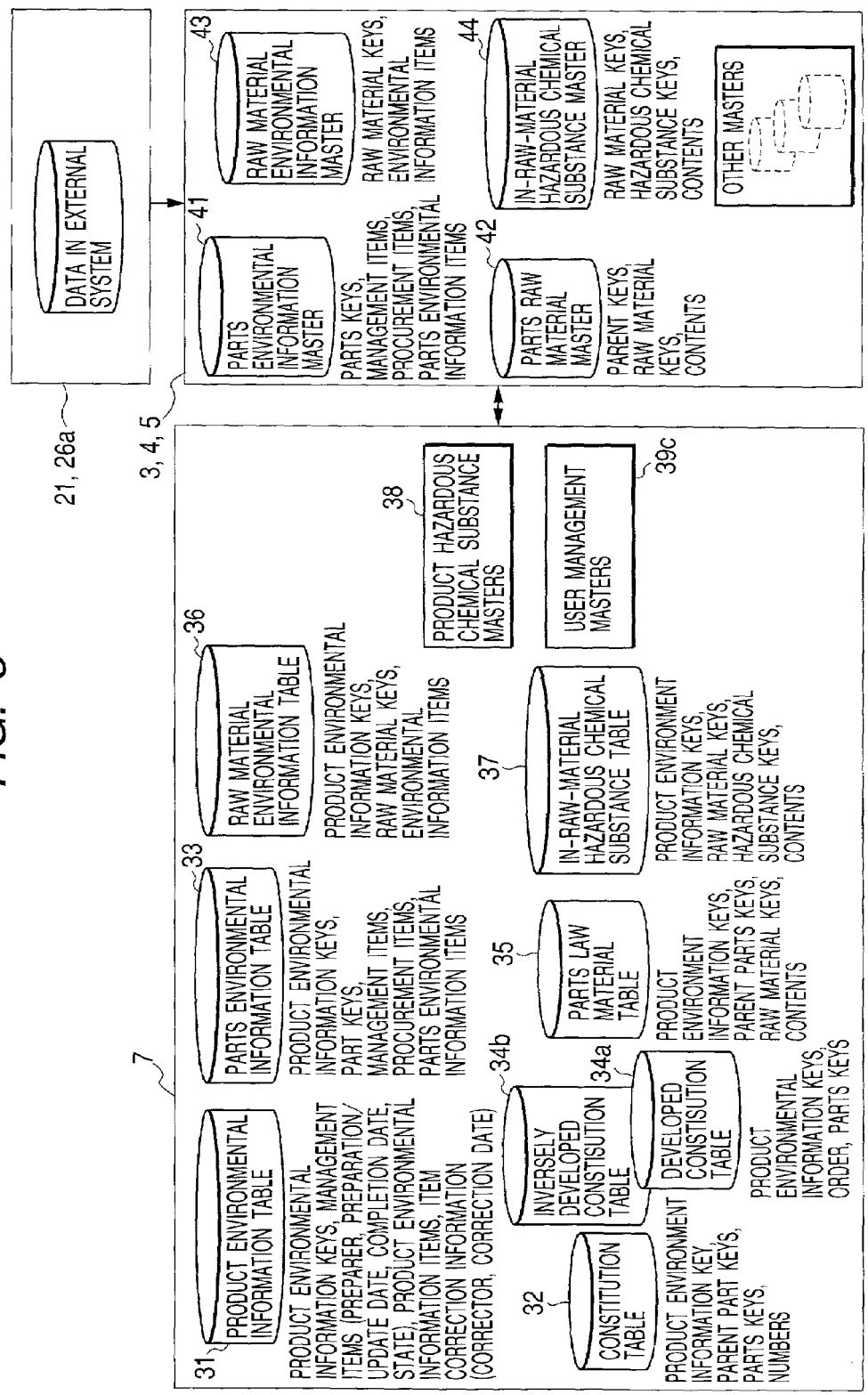
FIG. 3 is a diagram showing the structure of a data base.
Figure 4:
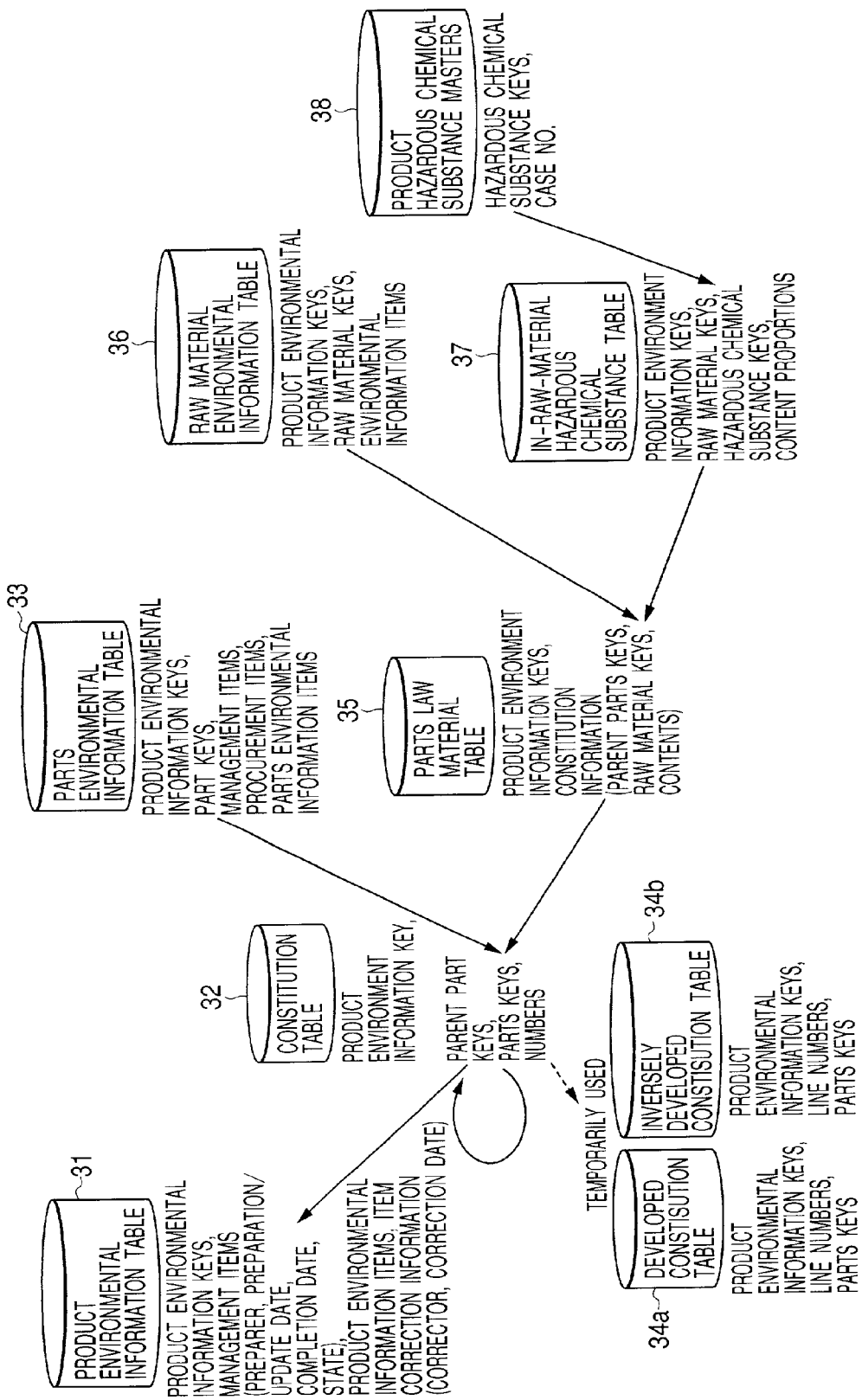
FIG. 4 is a diagram showing the relationship between tables in the data base.

FIG. 3 shows the internal configuration of the product environmental specification data base 7, the data bases 3, 4, and 5, and the external data bases 21 and 26a shown in FIG. 1. FIG. 4 shows the relationship between tables in the product environmental specification data base 7. The data bases 3, 4, and 5 are formed on the basis of the external data bases 21 and 26a and include a parts environmental information master 41, a parts raw material master 42, a raw material environmental information master 43, an in-raw-material hazardous chemical substance master 44, etc.

The parts environmental information master 41 has part keys, management items, procurement items, and parts environmental information items. The parts raw material master 42 has parent part keys, raw materials keys, and contents. The raw material environmental information master 43 has raw material keys and environmental information items. The in-raw-material controlled component master 44 has raw material keys, hazardous chemical substance keys, and content ratios.

The product environmental specification data base 7 has a product environmental information table 31, a constitution table 32, a parts environmental information table 33, a developed constitution table 34a, an inversely developed constitution table 34b, a parts raw material table 35, a parts raw material environmental information table 36, an in-raw-material hazardous chemical substance table 37, product hazardous chemical substance masters 38, and user management masters 39c.

The product environmental information table 31 has product environmental information keys (product ID keys), management items (preparer, preparation/update date, completion date, status), product environmental information items, item correction information (corrector, correction date).

The constitution table 32 has product environmental information keys, parent part keys, part keys, and numbers, and has information (constitution information) on parts and/or materials constituting each product in the product environmental information table 31.

The parts environmental information table 33 has product environmental information keys, part keys, management items, procurement items, and part environmental information items, and has environmental information about parts corresponding to part keys shown in the constitution table 32 (e.g., possibility/impossibility of reuse or the weight of parts used).

Each of the developed constitution table 34a and the inversely developed constitution table 34b has product environmental information keys, an order (line numbers), and part keys, and is temporarily used.

The parts raw material table 35 has product environmental information keys, parent part keys, raw material keys, and contents, and has information on raw materials of parts corresponding to part keys in the constitution table 32.

The raw material environmental information table 36 has product environmental information keys, raw material keys, and environmental information items, and has environmental information (e.g., the existence/nonexistence of hazardous substances or allowance/prohibition of recycling) about raw materials corresponding to raw material keys in the part raw material table 35.

The in-raw-material hazardous chemical substance (controlled component) table 37 has product environmental information keys, raw material keys, hazardous chemical substance (controlled component) keys, and content ratios, and has information on chemical substances in raw materials corresponding to raw material keys in the parts raw material table 35.

The product hazardous chemical substance masters 38 have hazardous chemical substance keys and CAS numbers (ID numbers of chemical substances generally used) and have information on chemical substances corresponding to hazardous chemical substance keys in the in-raw-material hazardous chemical substance table 37.

Data items on raw-materials and hazardous chemical substances can be totalized with respect to each product by searching the tables 31 to 37.

Figure 5:
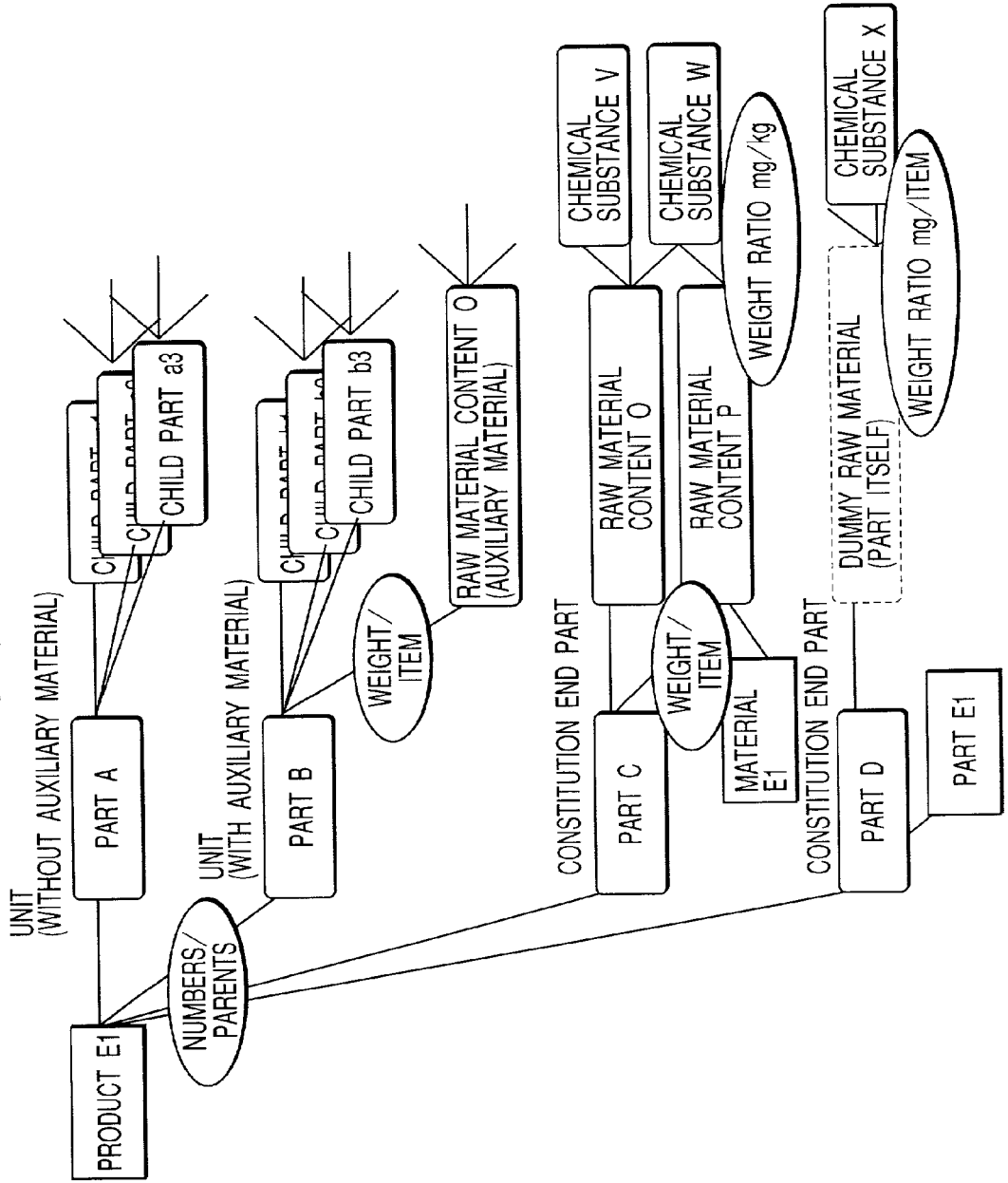
FIG. 5 is a diagram showing the relationship between parts and raw materials constituting a product.

FIG. 5 illustrates the tables shown in FIG. 4 as a part constitution diagram of a product relating to use of. In FIG. 5, "EI" denotes environmental information. The product EI (environmental information) is constituted by parts A to D, for example. Part A is constituted by child parts a1 to a3. Part B has child parts b1 to b3 and has a raw material contained-in-product O. Part C has raw material contained-in-product O and P and has chemical substances V and W. The raw material contained-in-product P has material EI (environmental information). The part D has part EI (environmental information) and has a chemical substance X.

Figure 7:
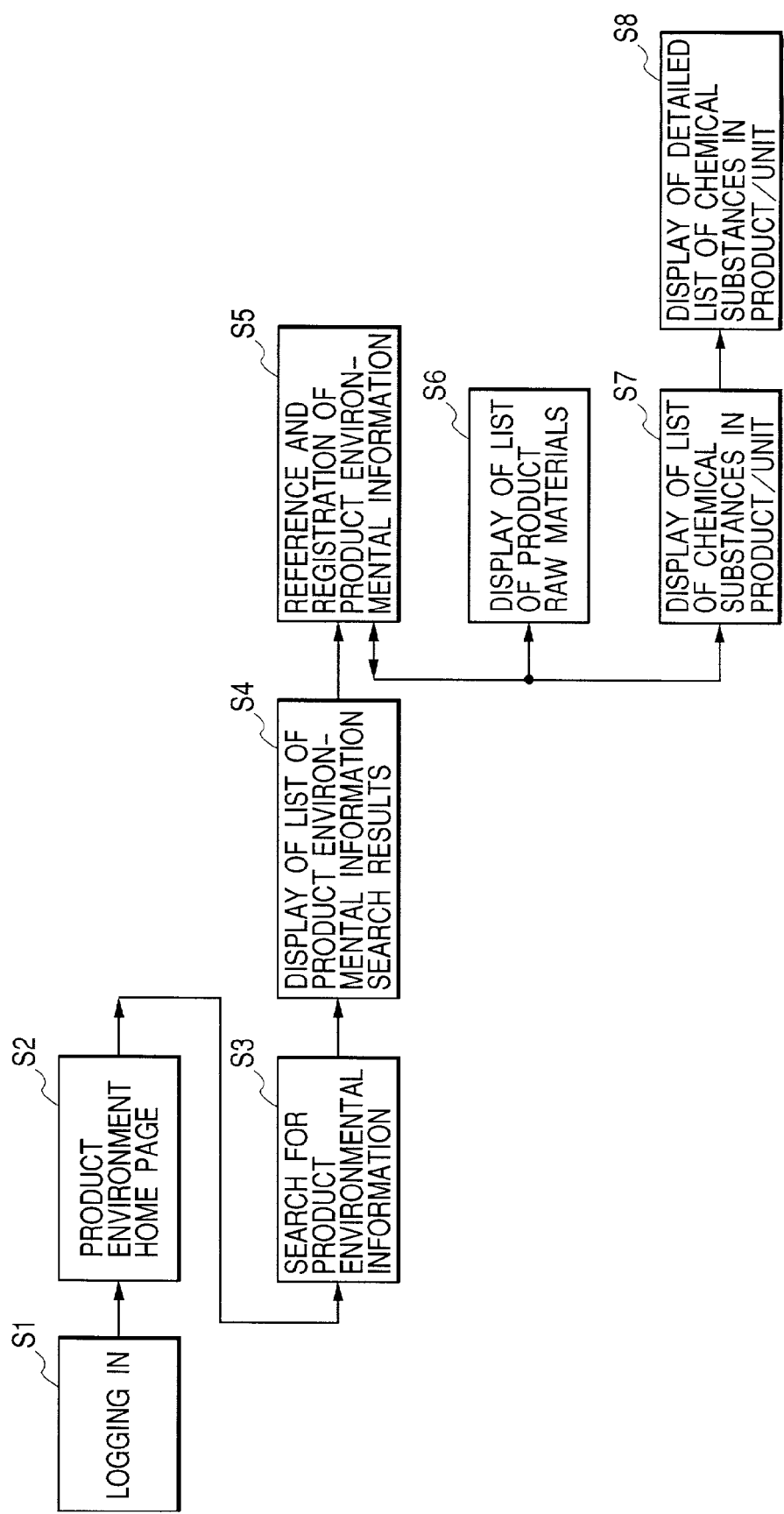
FIG. 7 is a flowchart of processing in the product environmental specification management system.

FIG. 7 is a flowchart showing a processing of the product environmental specification application 6 using the systems 9 and 10 shown in FIG. 1. The systems 9 and 10 perform processing by using a Web browser.

Figure 8:
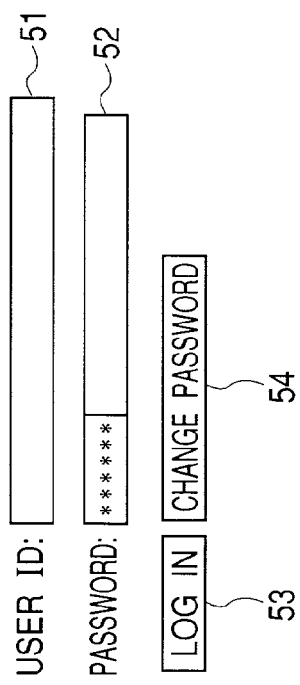
FIG. 8 is a diagram showing a login window.

In step S1, logging-in processing is performed by displaying a logging-in window shown in FIG. 8. Referring to FIG. 8, a user can log in by inputting a user ID 51 and a password 52 and clicking a login button 53 with a mouse. Only predetermined users are allowed to log in and unauthorized access to the system by other persons is prevented. A password change button 54 is used to change the password 52.

In step S2, menu processing is performed by displaying a product information home page shown in FIG. 9. Referring to FIG. 9, if the user clicks an item 61 "Search for Product Environmental Information" with the mouse, the process advances to step S3 and the user can search for and refer to environmental information already prepared with respect to each product. By clicking an item 62 "Search for parts Environmental Information" with the mouse, the user can search for and refer to environmental information about parts or a product used from the parts and materials. By clicking an item 63 "Reference to Masters" with the mouse, the user can refer to the contents of various masters including product chemical substances. By clicking an item 64 "Comparison of Product Assessments" with the mouse, the user can refer to and compare assessment targets with respect to products. Only an administrator can click an item 65 "Administer Menu" to newly prepare, finish or delete product environmental information. By clicking an item 66 "End", the user terminates the session and logs out.

Figure 10:
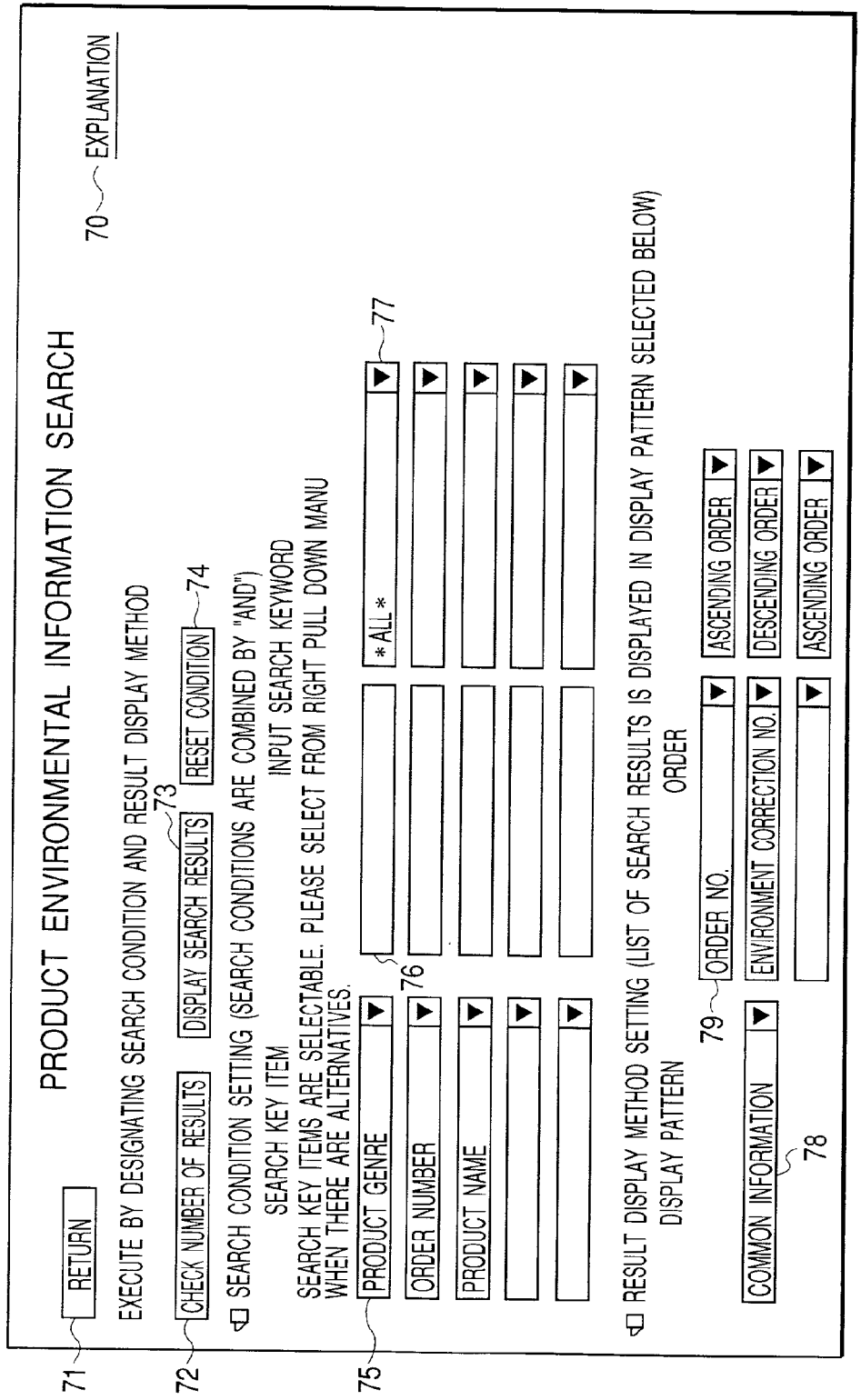
FIG. 10 is a diagram showing a product environmental information search window.

In step S3, search processing is performed by displaying a product environmental information search window shown in FIG. 10. If a return button 71 shown in FIG. 10 is clicked, the process returns to display of the window shown in FIG. 9. If an item 70 "Explanation" is clicked, an explanation of a search method is displayed. The user may select a search key item 75 and input a corresponding search key word 76, or may select one of some alternatives at 77. Search key items 75 are, for example, "Product Genre", "Order No.", "Product Name", etc. If a plurality of search condition items are provided, the AND (logical product) of them is used.

A result display method may be selected by setting a display pattern 78, ordered items 79, and ascending or descending order 80. Ordered items 79 are, for example, an order number, and an environment correction number.

When a number check button 72 is thereafter clicked, the number of results corresponding to the above-described search conditions is displayed in a right bottom section in the window. It is possible to cancel the above-described search conditions by clicking a condition reset button 74. A click on a search result display button 73 leads the process to advance to step S4, thereby search results displayed.

In step S4, a window shown in FIG. 11 is displayed which contains a list of the results of the product environmental information search. If a return button 86 shown in FIG. 11 is clicked, the process returns to display of the window shown in FIG. 10. If an item 84 "Explanation" is clicked, an explanation of a search result display method is displayed. In a search result list 85 are displayed order numbers, statuses, environment correction numbers, preparation information (preparers and preparation dates), product names, introduction dates, product genres, and product environmental information (e.g., average power consumption during operation, maximum power consumption during operation), etc. If an item 82 "Next 15 Results" is clicked, the next 15 results are displayed in search result list 85. If an item 83 "Download All Results" is clicked, all the results become downloadable. When one of product information buttons 81 is clicked, the process advances to step S5 and information on the corresponding product is displayed.

Display of the above-described search result list 85 is performed by using tables shown in FIGS. 12A to 12C. FIG. 12A shows a user master table containing user IDs, passwords, product genre groups, and user names. Product genres are determined with respect to each user. FIG. 12B shows a list system parameter table according to product genre grouping shown in FIG. 12A. This table contains a product genre group and items ATTR (e.g., order No., file division, status). FIG. 12C shows a product environmental information table corresponding to the items ATTR shown in FIG. 12B. This table contains product environmental information keys (order No., file division, correction No.), preparation/update dates, user names, statuses, and product environmental information items (average power consumption during operation, the amount of metal consumed, disassembly time, the amount of ozone generated).

Data corresponding to display items extracted from the list system parameter table (FIG. 12B) is obtained by searching the product environmental information table (FIG. 12C) to be displayed in the window shown in FIG. 11.

In step S5, a product environmental information reference/registration window shown in FIG. 13 is displayed. If a return button 90 shown in FIG. 13 is clicked, the process returns to display of the window shown in FIG. 11. If an item 96 "Explanation" is clicked, an explanation of this window is displayed. A click on an item 91 "List of Product Raw Materials" leads the process to advance to step S6, in which is displayed a list of the results of totalization of respective raw materials for different purposes, e.g., resin materials and pressed materials. A click on an item 92 "List of Product Chemical Substances" leads the process to advance to step S7, in which is displayed a list of chemical substances in the materials of products in a form classified in accordance with an intracorporate standard.

A click on an item 93 "Display of Constitution Information" triggers display of a list of parts configurations, in which items to be displayed can be selected from display patterns. A click on an item 94 "Search for Information on Items in Product Category" triggers a search for items in the ordered category. The results of this search are shown in a list according to a selected display pattern.

As product assessment information 95, each of "Common Information", "Energy Saving", "Space Saving", "Resource Saving", "Long Life", "Recoverability", "Decomposability", "Separability", "Recyclability", "Environmental Friendliness", "Disposability (Reducing Hazardous Substances)", "Packaging", "Information Disclosure", and "Environmental Management" can be selected, referred to or registered. Data on one of these items referred to or registered is displayed in an area 97. A click on a Download button 100 triggers downloading of information already registered. A click on an Add button 101 triggers addition of data in the area 97. A click on a Clear button 102 triggers clearing the area 97 of the information. A click on a Register button 98 triggers registering as product assessment information the information displayed in the area 97. A click on a reset button 99 triggers resetting to the initial state.

FIGS. 14A and 14B show tables for displaying the window shown in FIG. 13. FIG. 14A shows an input system parameter table containing a genre group and items ATTR (order No., file division, environment correction No., preparation date, preparer user name, status), etc. FIG. 14B shows a product environmental information table corresponding to the items ATTR shown in FIG. 14A. This table contains product environmental information keys (order number, file division, environment correction No.), preparation dates, preparer user names, statuses, product environmental information items (average power consumption during operation, the amount of metal consumed, disassembly time, the amount of ozone generated).

Input items set in the input system parameter table (FIG. 14A) according to genres for the login user are extracted, as are those in the case of the product environmental information search result list window (FIG. 11). Data is obtained by searching the product environmental information table (FIG. 14B) on the basis of the input items extracted from the input system parameter table (FIG. 14A) to be displayed in the product environmental information reference/registration window (FIG. 13).

In step S6, a product raw material list window shown in FIG. 15 is displayed. If a return button 113 shown in FIG. 15 is clicked, the process returns to display of the window shown in FIG. 13. If an item 114 "Explanation" is clicked, an explanation of this window is displayed. When a kind of process step (e.g., one indicated by "MO" (molded material), or one indicated by "PX" (pressed material)) 111 is selected, and when an Execute button 112 is clicked, a list 115 of product raw materials corresponding to the selected process step is displayed. The product raw material list 115 contains the kind of process step, part/material division, maker codes, maker names, material symbols, material names, thickness, the amounts of material used, information about use of recycled resources, recycled material contents, the existence/nonexistence of a prohibited chemical substance ("Y" indicating the existence, "N" indicating the nonexistence), the existence/nonexistence of a prohibited chemical substance ("Y" indicating the existence, "N" indicating the nonexistence), the existence/nonexistence of a chemical substance to be reduced ("Y" indicating the existence, "N" indicating the nonexistence), the existence/nonexistence of a chemical substance to be controlled ("Y" indicating the existence, "N" indicating the nonexistence), recyclability, material display for recycling, identification of a Blue Angel qualified copying machine, identification of a Blue Angel qualified LBP (laser printer), identification of a Blue Angel qualified BJP (bubble jet printer), identification of a Blue Angel qualified BJCRG (cartridge), information about green certificate, comments, the green certification date. If an item 116 "Next 10 Results" is clicked, the next 10 results are displayed in the list 115.

If an item 117 "Download All Results" is clicked, all the results become downloadable. When one of used part buttons 116 related to the raw materials in the list 115 is clicked, information on the corresponding used part is displayed.

FIGS. 16A to 16E show tables for displaying the window shown in FIG. 15. FIG. 16A shows a selection system parameter table containing the product genre group and the menu ID (DSMENU_ID). FIG. 16B shows a menu parameter table corresponding to the menu ID shown in FIG. 16A. This table contains the product genre group, the menu ID, and data (molded material (resin material), pressed material (metallic material), paper material, etc.) DATA. FIG. 16C shows a list system parameter table containing the product genre group, items ATTR (order No., file division, correction No., kind of process step). FIG. 16D shows a parts environmental information table corresponding the items ATTR shown in FIG. 16C. This table contains product environmental information keys (order No., file division, correction No.), part keys (part No., size, file division, process step), dealers, part names, and parts environmental information (part weight, recycling rate, use/non-use of a recycled part, green certification rank). FIG. 16E shows a part raw material table corresponding to the kind of process step shown in FIG. 16C. This table contains product environmental information keys (order No., file division, correction No.), parent part keys (parent part No., parent part size, parent part file division, parent part process step), raw material keys (kind of process step, maker code, material symbol, grade number, coloring number), and contents.

With respect to the kind of raw material selected in the menu and displayed, set raw material list items are extracted on the basis of the parameters shown in FIGS. 16A to 16C, and corresponding data is obtained by searching the part environmental information table (FIG. 16D) and the part raw material table (FIG. 16E) to be displayed in the window.

In step S7, a product/unit chemical substance list window shown in FIG. 17 is displayed. If a return button 121 shown in FIG. 17 is clicked, the process returns to display of the window shown in FIG. 15. If an item 122 "Explanation" is clicked, an explanation of this window is displayed. In a product/unit chemical substance list 127 are displayed control divisions (e.g., prohibition and reduction), classification numbers, classified names, and contents. A click on one of used part buttons 128 related to the chemical substance classes in the list 127 triggers display of information on parts in which a chemical substance in the chemical substance class is used.

If an item 125 "Next 10 Results" is clicked, the next 10 results are displayed in the list 127. If an item 126 "Download All Results" is clicked, all the results become downloadable. A click on an item 123 "Product/Unit Chemical Substance List (Detailed)" leads the process to advance to step S8, in which is displayed a window containing a detailed list of product/unit chemical substances, i.e., a detailed list of all chemical substances in a product. A click on an item 124 "Chemical Substance Master Search" triggers a search in the chemical substance master data base.

FIGS. 18A to 18J show tables for displaying the window shown in FIG. 17. FIG. 18A shows a list system parameter table containing the product genre group and items ATTR (control division, classification No., classified name). FIG. 18B shows a constitution table containing product environmental information keys (order No., file division, correction No.), part keys (part ID, size, file division, process step), and numbers. FIG. 18C shows a part raw material table corresponding to the part keys shown in FIG. 18B and containing product environmental information keys (order No., file division, correction No.), parent part keys (parent part ID, parent part size, parent part file division, parent part process step), raw material keys (kind of process step, maker code, material symbol, grade number, coloring number), and weights. FIG. 18D shows an in-raw-material hazardous chemical substance table corresponding to the raw material keys shown in FIG. 18C and containing product environmental information keys (order No., file division, correction No.), raw material keys (kind of process step, maker code, material symbol, grade number, coloring number), hazardous chemical substance keys (classification number, substance number), and contents. FIG. 18E shows a typical material master table section corresponding to the classification number in the hazardous chemical substance keys shown in FIG. 18D. This table section contains the classification No., a classified name, a control division, and a preparation date. FIG. 18F shows a substance master table section corresponding to the substance number in the hazardous chemical substance keys shown in FIG. 18D. This table section contains the substance number, a substance name, a CAS number, a preparation date, etc. FIG. 18G is a low-regulation master section. FIG. 18H is a label master section. FIG. 18I is a chemical substance regulating law master section. FIG. 18J is a chemical substance regulating law master section.

The part raw material table (FIG. 18C) is searched by using the parts keys contained in the constitution table (FIG. 18B) to extract raw material keys. The in-raw-material hazardous chemical substance table (FIG. 18D) is searched by using the raw material keys to extract contained hazardous chemical substance information. The typical substance master table (FIG. 18E) and the substance master table (FIG. 18F) are searched from the contained hazardous chemical substance information to display data corresponding to the display items set as display parameters.

In step S8, a detailed product/unit chemical substance list window shown in FIG. 19 is displayed. If a return button 131 shown in FIG. 19 is clicked, the process returns to display of the window shown in FIG. 17. If an item 132 "Explanation" is clicked, an explanation of this window is displayed. In a detailed product/unit chemical substance list 135 are displayed control divisions (e.g., prohibition and reduction), classification numbers, classified names, substance numbers, substance names, CAS numbers, and contents. If an item 133 "Next 10 Results" is clicked, the next 10 results are displayed in the list 135. If an item 134 "Download All Results" is clicked, all the results become downloadable.

A click on one of used part buttons 136 related to the chemical substances in the list 135 triggers display of information on parts using the corresponding chemical substance. A click on one of items 137 "Label" triggers display of environmental label information about the corresponding chemical substance. A click on one of items 138 "Law Regulation" triggers display of law regulation information about the corresponding chemical substance. To display this window, the tables shown in FIGS. 18A to 18J are also used.

Figure 20:
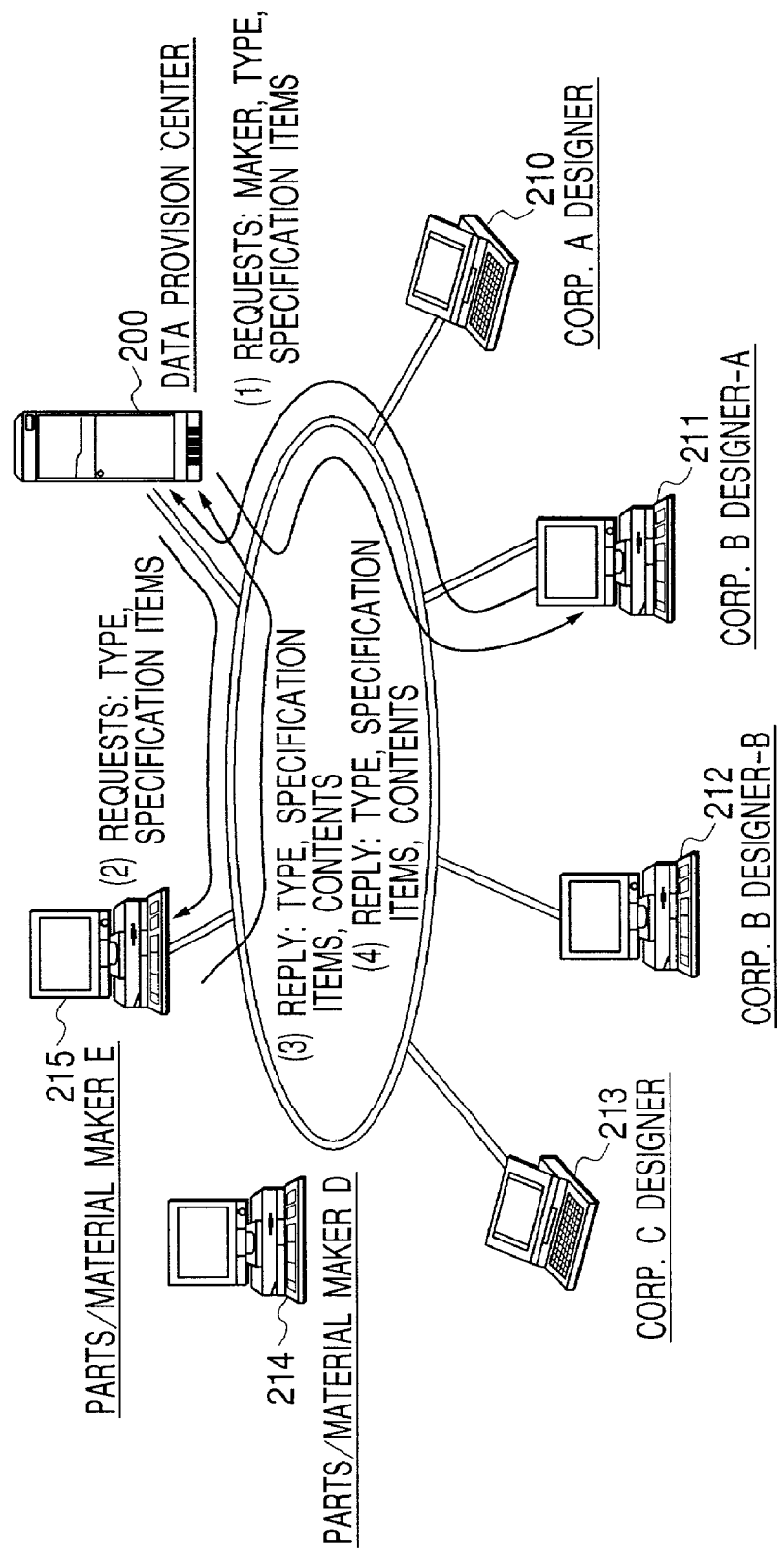
FIG. 20 is a diagram showing a case where parts/raw material information is shared between a plurality of corporations.

FIG. 20 is a diagram showing a case where parts/raw material information in the product environmental specification management system shown in FIG. 1 is shared between a plurality of corporations, and where designers 210 to 213 in corporations A, B, and C, and part/raw material makers D 214, and E 215 obtain part/raw material environmental information through a data provision center 200.

In this case, (1) a procedure described below is used. First, the designer (A)211 in corporation B makes an inquiry about a maker (corporation E in this case), a type and specification items. (2) The data provision center 200 requests the parts/material maker E 215 to make a reply about the type and specification items. (3) The parts/material maker E 215 replies to the data provision center 200 about the requested type and specification items. The data provision center 200 sends the reply to the corporation B designer (A)211 who made the inquiry.

Figure 21:
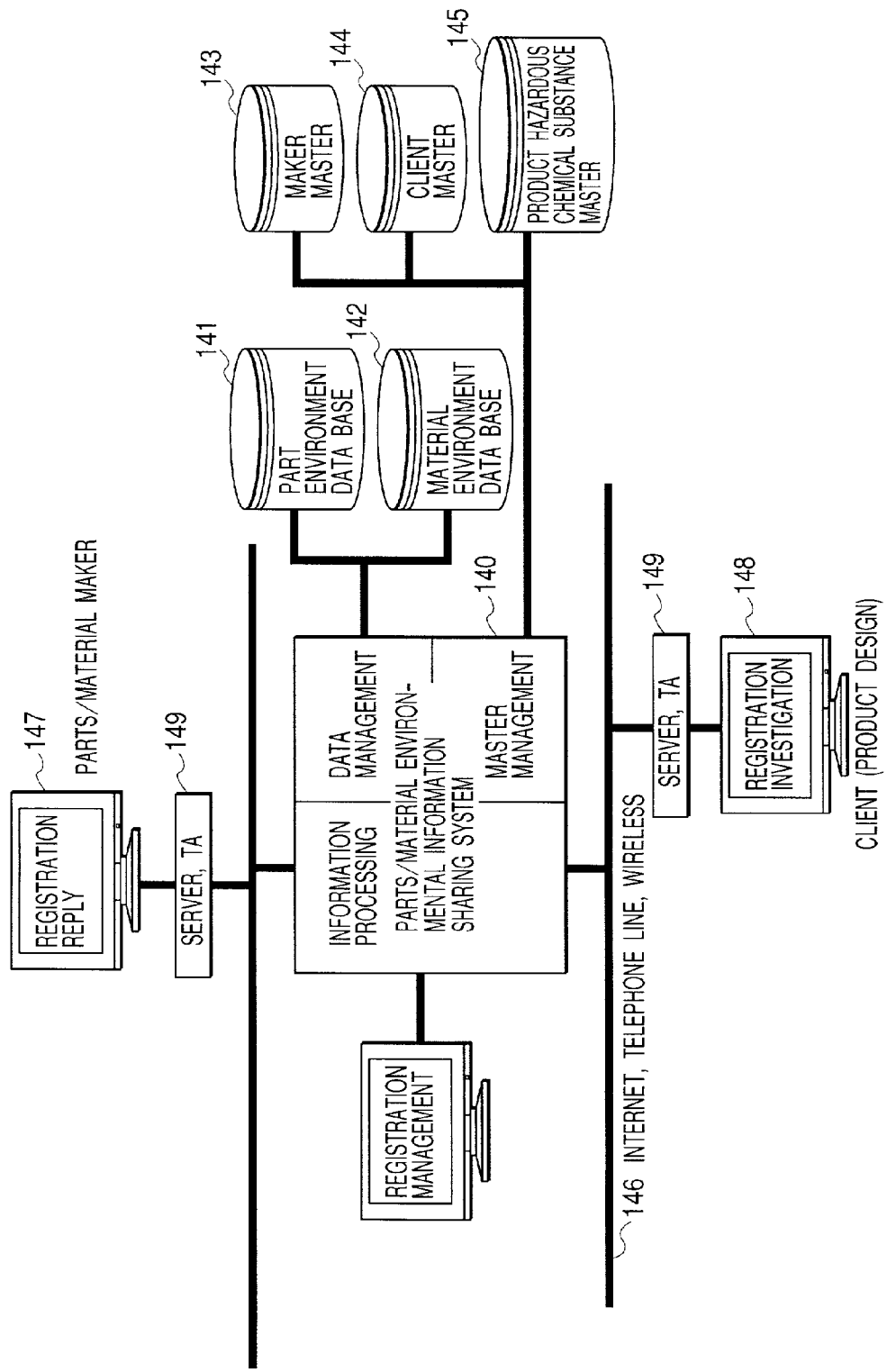
FIG. 21 is a diagram showing the network configuration of a parts/material environmental information sharing system in which parts/material environmental information is shared between corporations.

FIG. 21 is a diagram showing the network configuration of a part/material environmental information sharing system 140 for sharing part/material environmental information between corporations. The part/material environmental information sharing system 140 is constituted by a part environment data base 141 and a material environment data base, used for data management, and a maker master 143, a client master 144 and a product hazardous chemical substance master 145, used for master management. When a client 148 connected to Internet 146 by a server/TA 149 makes an inquiry (registration investigation) about part/material information, terminal data is collected according to the inquiry and a reply (registration reply) from a part/material maker 147.

Figure 22:
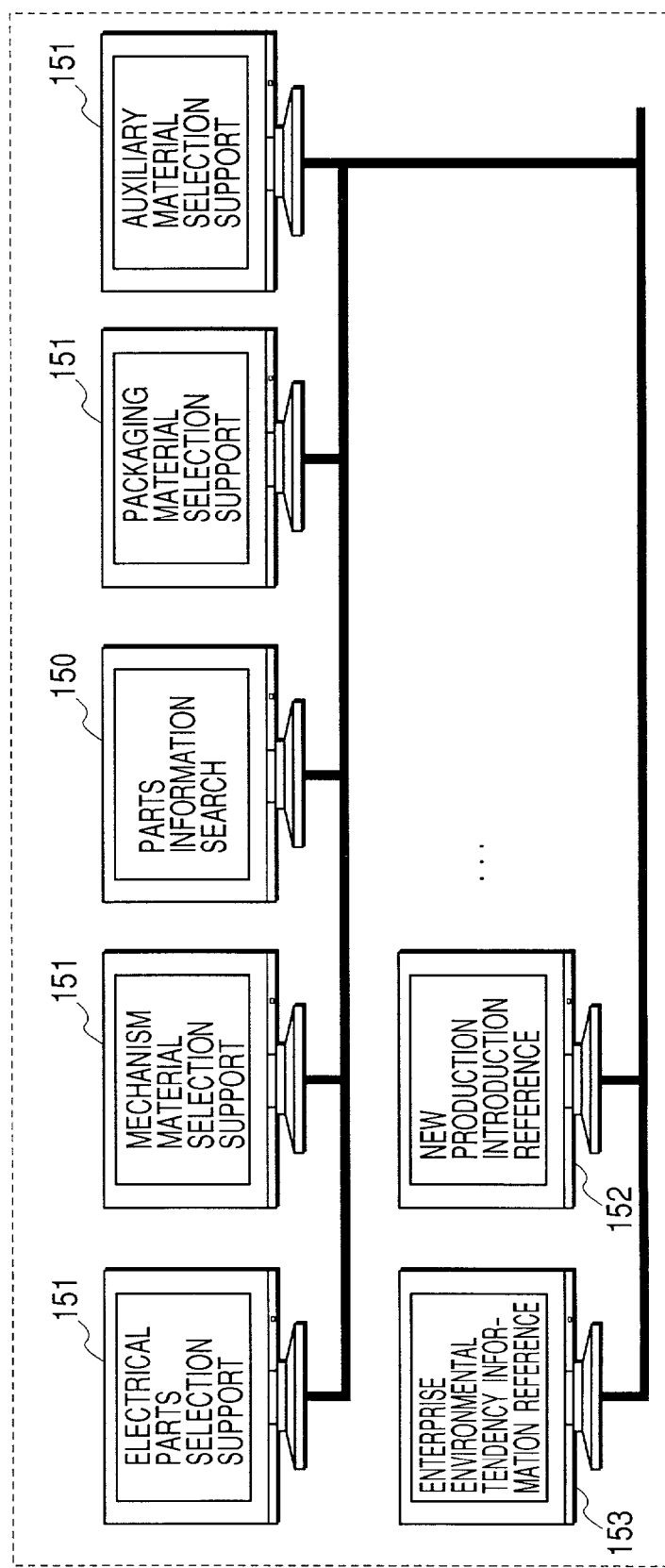
FIG. 22 is a diagram showing an example of a client terminal display.

FIG. 22 is a diagram showing an example of display of terminals at client 148.

Client 148 can refer to environmental information about any part through a part information search window 150 and can also obtain information through electric parts, mechanism material, packaging material, and auxiliary material support 151 windows. Client 148 can also read information in a window for a new product introduction reference 152 to parts/materials registered by a parts/material maker without registration investigation by the client, and information in a window for an enterprise environmental tendency information reference 153 about parts/material makers.

Figure 23:
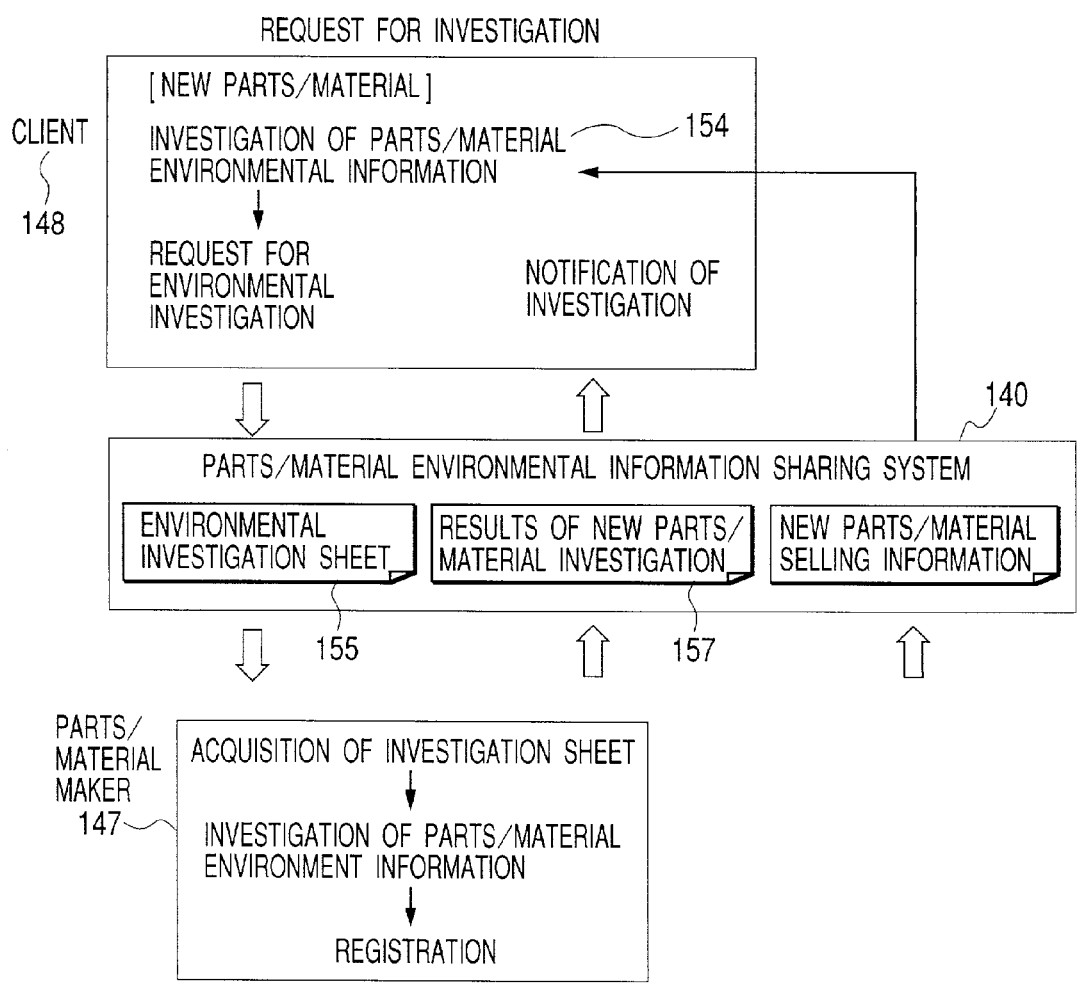
FIG. 23 is a diagram showing details of flow of parts/material environmental information between corporations.

FIG. 23 shows details of the above-described information flow.

First, client 148 obtains information by making investigation 154 into part/material environmental information existing in the part/material environmental information sharing system 140. In the case of absence of the desired information, a data provision center 139 sends an environmental investigation request 155 to part/material maker 147.

Part/material maker 147 makes part/material environmental information investigation. Client 148 is then informed of new part/material investigation results 157.

Units/products and unit/products makers, as an alternative to parts/materials and parts/material makers, may also be used. In such a case, a unit/product environmental information sharing system is formed in place of part/material environmental information sharing system to enable consumers, corporations and government agencies to search and refer to information in a crossover manner.

In this embodiment, as described above, a design system, a procurement system and environmental information data base are linked to enable acquisition of product information on the basis of information on parts and raw materials constituting a product. The information system of the present invention also enables environmentally friendly designing and manufacturing using parts/raw material environmental information and product environmental information while considering environmental problems. Further, the information system can be used for product environmental information investigation at the time of green purchase by a consumers, a corporation or a government agency.

The information system of the present invention also makes it possible to grasp raw materials used in a product and hazardous substances contained in the materials and is, therefore, advantageously effective in determining a product recycling method and in preventing environmental pollution upon the waste disposal. In designing a product, reference to parts/raw material information and product information, including environmental information, in accordance with the present invention contributes to the improvement in the reliability of the product. It also contributes to the reduction in the number of kinds of raw materials used in the product, thereby improving the facility with which the materials of the product are separated. Therefore the information system of the present invention is effective in promoting recycling and in reducing the amount of hazardous chemical substance waste.

Referring back to FIG. 1, the parts or raw materials constituting a product in the parts constitution information system 26 may be changed as a result of a design change. It is desirable to reconstruct the product environmental specification data base 7 each time the constitution information supplied from the parts constitution information system 26 to the product environmental specification management system 1 is changed. However, if the product environmental specification data base 7 is frequently reconstructed, the load on the product environmental specification management system 1 becomes so large that users cannot refer to the data base 7. Therefore the data base 7 may be reconstructed only when the constitution information is substantially changed. For example, the data base 7 may be changed when a raw material constituting a product is changed or when the number of parts or raw materials constituting a product is changed.

When the data base 7 is reconstructed, it is desirable that the contents of the data base 7 in the past should be maintained. For example, when a product is supplied to the market, a plurality of corresponding models varying in design exist mixedly on the market. In such a case, the contents of the data base 7 can be referred to obtain information on each of the plurality of models if the information on the previous models is maintained.

The information system of the present invention can cope with regulations under laws in various countries.

The present invention also comprises supplying a program code for software for realizing the functions of the above-described embodiment and performing the functions by processing in accordance with a program stored in a system computer (CPU or MPU).

In such a case, the software program code itself realizes the functions of the above-described embodiment, and the program code itself and means for supplying the program code to the computer, e.g., a recording medium on which the program code is stored, constitute the present invention. Examples of the recording medium for storing such a program code are a floppy disk, a hard disk, an optical disk, a magneto-optical disk, a compact disc-read only memory (CD-ROM), a magnetic tape, a nonvolatile memory card, and a read only memory (ROM).

The above-described embodiment of the present invention illustrates only an example of implementation of the invention and is not construed as limiting the technical scope of the invention. That is, the present invention can be implemented in other various forms without departing from its technical spirit or from its essential features.

According to the present invention, as described above, environmental information about parts or raw materials used in a product can be controlled, which is remarkably effective in preventing environmental pollution when the product is disposed of. Reference to this information in designing the product contributes to the improvement in reliability of the product and also contributes to the reduction in the number of raw materials used in the product to facilitate separation of the product materials. The present invention is therefore effective in promoting recycling and reducing the amount of hazardous chemical waste.

What is claimed is:

1. An environmental information system comprising:
   product constitution storage means for storing product constitution information including information about parts and raw materials constituting each product;
   parts raw material information means for storing raw material of each part stored by said product constitution storage means;
   raw material environmental information storage means for storing environmental information about an amount of each of the hazardous substance included in each of the raw materials stored by said parts raw material information means;
   obtaining means for obtaining information about each of the hazardous substance in raw materials of parts which constitute a designated product; and
   integrated environmental information forming means for forming integrated environmental information including a total amount of each of the hazardous substance of the designated product based on a result of the information obtained by said obtaining means.

2. A system according to claim 1, wherein information about the raw materials includes information about whether or not the hazardous substance as a chemical substance to be environmentally prohibited, reduced and controlled is contained.

3. A system according to claim 1, further comprising user information storage means for storing user information, wherein said integrated environmental information forming means forms integrated environmental information on the basis of the user information.

4. A system according to claim 1, further comprising:
   a product environmental information storage section for storing environmental information about the products, wherein said integrated environmental information forming means forms integrated environmental information with respect to each product on the basis of the environmental information about the raw materials and the product environmental information about the products.

5. A system according to claim 1, wherein the product environmental information includes at least one of power consumption, the amount of a metal consumed, the disassembly time, and the amount of ozone generated.

6. A system according to claim 1, wherein said integrated environmental information forming means forms integrated environmental information with respect to each product by assigning one key information item to one product.

7. A system according to claim 1, further comprising search means for searching the integrated environmental information.

8. A system according to claim 7, further comprising display means for displaying a result of a search through the integrated environmental information searched by said search means.

9. A method of processing environmental information, comprising the steps of:
   storing product constitution information including information about parts and raw materials constituting each product;
   storing raw material of each part stored in said step of storing product constitution information;
   storing environmental information about an amount of each of the hazardous substance included in each of the raw materials stored in said step of storing raw material of each part;
   obtaining information about each of the hazardous substance in raw materials of parts which constitute a designated product; and
   forming integrated environmental information including a total amount of each of the hazardous substance of the designated products based on a result of the information obtained in said step of obtaining information.

10. A computer-readable recording medium storing the steps of:
   storing product constitution information including information about parts and raw materials constituting each product;
   storing raw material of each part stored in said step of storing product constitution information;
   storing environmental information about an amount of each of the hazardous substance included in each of the raw materials stored in said step of storing raw material of each part;
   obtaining information about each of the hazardous substance in raw materials of parts which constitute a designated product; and
   forming integrated environmental information including a total amount of each of the hazardous substance of the designated product based on a result of the information obtained in said step of obtaining information.

* * * * *